US009195062B2

(12) United States Patent
Arai et al.

(10) Patent No.: US 9,195,062 B2
(45) Date of Patent: Nov. 24, 2015

(54) OPTICAL SCANNING DEVICE AND IMAGE FORMING APPARATUS

(75) Inventors: Nobuyuki Arai, Kanagawa (JP); Makoto Hirakawa, Kanagawa (JP); Naoki Miyatake, Kanagawa (JP); Naoto Watanabe, Kanagawa (JP); Tadashi Nakamura, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 132 days.

(21) Appl. No.: 13/342,510

(22) Filed: Jan. 3, 2012

(65) Prior Publication Data
US 2012/0177409 A1    Jul. 12, 2012

(30) Foreign Application Priority Data

Jan. 7, 2011    (JP) ................................. 2011-001600

(51) Int. Cl.
*G02B 26/12*    (2006.01)
*B41J 2/447*    (2006.01)
*B41J 2/47*    (2006.01)
*G03G 15/04*    (2006.01)

(52) U.S. Cl.
CPC .............. *G02B 26/125* (2013.01); *B41J 2/447* (2013.01); *B41J 2/473* (2013.01); *G02B 26/123* (2013.01); *G03G 15/04072* (2013.01)

(58) Field of Classification Search
CPC .......... B41J 2/473; B41J 2/471; B41J 29/377; G02B 26/123; G02B 26/125
USPC ......... 347/134, 137, 138, 152, 241, 242, 243, 347/244, 257, 259, 260, 261, 263; 359/200.1, 205.1, 207.6
See application file for complete search history.

(56) References Cited

U.S. PATENT DOCUMENTS

| 5,680,254 | A  | 10/1997 | Ueda et al. |
| 6,621,512 | B2 | 9/2003  | Nakajima et al. |
| 6,771,300 | B2 | 8/2004  | Amada et al. |
| 6,804,064 | B2 | 10/2004 | Hirakawa |
| 6,813,051 | B2 | 11/2004 | Suzuki et al. |
| 6,829,102 | B2 | 12/2004 | Ohashi et al. |

(Continued)

FOREIGN PATENT DOCUMENTS

| JP | 2000-121975 | 4/2000 |
| JP | 2003-215490 | 7/2003 |

(Continued)

OTHER PUBLICATIONS

Japanese Office Action issued Jun. 3, 2014, in Japan Patent Application No. 2011-001600.

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

Each scanning optical system includes a first scanning lens and a second scanning lens through which a light beam is incident onto the first scanning lens. The second scanning lens of each scanning optical system is disposed at the optically most downstream side in the scanning optical system and has an optical plane that has the strongest power in a sub-scanning corresponding direction. In addition, the optical plane of each second scanning lens, which has the strongest power in the sub-scanning corresponding direction, is located under the shaft bearings of neighboring polygon mirrors in the vertical direction.

19 Claims, 22 Drawing Sheets

(56) References Cited

U.S. PATENT DOCUMENTS

| | | | |
|---|---|---|---|
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,088,484 B2 | 8/2006 | Hayashi et al. | |
| 7,161,724 B1 | 1/2007 | Miyatake | |
| 7,167,288 B2 | 1/2007 | Miyatake et al. | |
| 7,277,212 B2 | 10/2007 | Miyatake et al. | |
| 7,385,181 B2 | 6/2008 | Miyatake et al. | |
| 7,411,712 B2 | 8/2008 | Nakajima et al. | |
| 7,471,434 B2 | 12/2008 | Nakamura et al. | |
| 7,538,925 B2 | 5/2009 | Miyatake | |
| 7,545,547 B2 | 6/2009 | Hayashi et al. | |
| 7,551,337 B2 | 6/2009 | Hirakawa et al. | |
| 7,623,280 B2 | 11/2009 | Hirakawa et al. | |
| 7,626,744 B2 | 12/2009 | Arai et al. | |
| 7,633,663 B2 | 12/2009 | Hirakawa et al. | |
| 7,643,193 B2 | 1/2010 | Nakamura et al. | |
| 7,687,762 B2 | 3/2010 | Watanabe et al. | |
| 7,728,863 B2 | 6/2010 | Miyatake et al. | |
| 7,729,031 B2 | 6/2010 | Nakamura et al. | |
| 7,738,007 B2 | 6/2010 | Ichii et al. | |
| 7,764,301 B2 | 7/2010 | Suzuki et al. | |
| 7,777,967 B2 | 8/2010 | Hirakawa | |
| 7,855,818 B2 | 12/2010 | Nakamura | |
| 7,869,110 B2 | 1/2011 | Nakamura et al. | |
| 7,903,135 B2 | 3/2011 | Ichii et al. | |
| 7,924,487 B2 | 4/2011 | Miyatake et al. | |
| 7,929,007 B2 | 4/2011 | Miyatake | |
| 7,961,211 B2 | 6/2011 | Nakamura | |
| 7,969,634 B2 | 6/2011 | Watanabe et al. | |
| 7,969,635 B2 | 6/2011 | Miyatake | |
| 7,999,970 B2 | 8/2011 | Miyatake | |
| 8,022,347 B2 | 9/2011 | Tatsuno et al. | |
| 8,023,166 B2 | 9/2011 | Nakamura et al. | |
| 8,045,248 B2 | 10/2011 | Watanabe et al. | |
| 8,077,368 B2 | 12/2011 | Miyatake | |
| 8,085,455 B2 | 12/2011 | Hirakawa | |
| 2006/0290773 A1* | 12/2006 | Fukutomi | 347/238 |
| 2008/0055672 A1 | 3/2008 | Watanabe et al. | |
| 2008/0068691 A1 | 3/2008 | Miyatake | |
| 2008/0069585 A1* | 3/2008 | Amada | 399/94 |
| 2008/0123159 A1 | 5/2008 | Hayashi et al. | |
| 2008/0180772 A1 | 7/2008 | Miyatake et al. | |
| 2008/0219601 A1 | 9/2008 | Arai et al. | |
| 2008/0225105 A1* | 9/2008 | Kudo | 347/235 |
| 2008/0267662 A1 | 10/2008 | Arai et al. | |
| 2008/0285104 A1 | 11/2008 | Arai et al. | |
| 2009/0059335 A1* | 3/2009 | Amada et al. | 359/198 |
| 2009/0073523 A1 | 3/2009 | Nakamura | |
| 2009/0091732 A1* | 4/2009 | Kato | 355/67 |
| 2009/0115834 A1* | 5/2009 | Nakajima | 347/263 |
| 2009/0141316 A1 | 6/2009 | Arai et al. | |
| 2009/0175656 A1* | 7/2009 | Kim et al. | 399/221 |
| 2009/0195636 A1 | 8/2009 | Arai et al. | |
| 2009/0195849 A1 | 8/2009 | Ichii et al. | |
| 2009/0214261 A1 | 8/2009 | Hirakawa et al. | |
| 2009/0251753 A1 | 10/2009 | Hirakawa et al. | |
| 2010/0091083 A1 | 4/2010 | Itami et al. | |
| 2010/0091342 A1 | 4/2010 | Nakamura | |
| 2010/0183337 A1 | 7/2010 | Kubo et al. | |
| 2011/0012982 A1 | 1/2011 | Arai | |
| 2011/0052263 A1 | 3/2011 | Tatsuno et al. | |
| 2011/0058230 A1 | 3/2011 | Soeda et al. | |
| 2011/0110687 A1 | 5/2011 | Miyatake et al. | |
| 2011/0122217 A1 | 5/2011 | Arai et al. | |
| 2011/0129259 A1* | 6/2011 | Nakano et al. | 399/221 |
| 2011/0216386 A1 | 9/2011 | Watanabe et al. | |
| 2011/0221857 A1 | 9/2011 | Tatsuno et al. | |
| 2011/0318057 A1 | 12/2011 | Watanabe | |

FOREIGN PATENT DOCUMENTS

| | | |
|---|---|---|
| JP | 2005-153347 | 6/2005 |
| JP | 2005-242024 | 9/2005 |
| JP | 2006-267398 | 10/2006 |
| JP | 2007-10797 | 1/2007 |
| JP | 2007-65565 | 3/2007 |
| JP | 2007-178824 | 7/2007 |
| JP | 2008-299051 | 12/2008 |
| JP | 2010-72050 | 4/2010 |

* cited by examiner

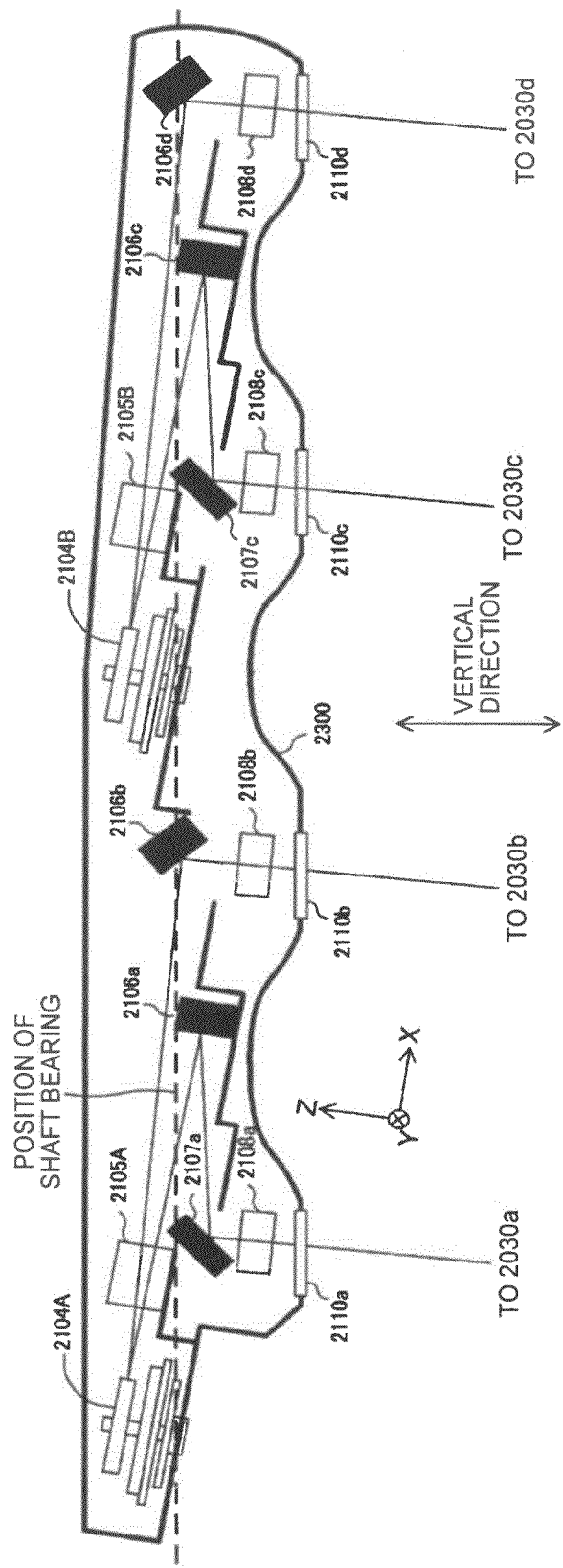

FIG.7

| | INCIDENCE OPTICAL PLANE | EMITTING OPTICAL PLANE |
|---|---|---|
| Rm | -41.8 | -29.5 |
| K | 0 | 0 |
| A | $2.7303 \times 10^{-6}$ | $2.9273 \times 10^{-6}$ |
| B | $-6.9005 \times 10^{-9}$ | $-7.3604 \times 10^{-10}$ |
| C | $-1.5163 \times 10^{-11}$ | $-1.3118 \times 10^{-11}$ |
| D | $4.1762 \times 10^{-14}$ | $2.4482 \times 10^{-14}$ |
| E | $-1.2110 \times 10^{-18}$ | $-4.6546 \times 10^{-17}$ |
| F | $-4.7121 \times 10^{-20}$ | $3.6515 \times 10^{-20}$ |
| Rz | ∞ | ∞ |
| a | 0 | 0 |
| b | 0 | 0 |
| c | 0 | 0 |
| d | 0 | 0 |

UNIT: mm

FIG.8

| | INCIDENCE OPTICAL PLANE | EMITTING OPTICAL PLANE |
|---|---|---|
| Rm | -1250.0 | 726.0 |
| K | 0 | 0 |
| A | $-9.9232 \times 10^{-8}$ | $-4.0030 \times 10^{-7}$ |
| B | $2.1102 \times 10^{-11}$ | $4.2079 \times 10^{-11}$ |
| C | 0 | $3.0878 \times 10^{-15}$ |
| D | 0 | $-1.7548 \times 10^{-18}$ |
| E | 0 | $2.8117 \times 10^{-22}$ |
| F | 0 | $-1.5299 \times 10^{-26}$ |
| Rz | ∞ | -27.0 |
| a | 0 | $2.7550 \times 10^{-6}$ |
| b | 0 | $-6.4611 \times 10^{-10}$ |
| c | 0 | $9.6037 \times 10^{-14}$ |
| d | 0 | $-4.6666 \times 10^{-18}$ |

UNIT: mm

| d1 | d2 | d3 | d4 | d5 | d6 | d7 | d8 | d9 |
|---|---|---|---|---|---|---|---|---|
| 12.54 | 2.98 | 12.02 | 8.10 | 3.00 | 81.00 | 25.00 | 90.85 | 93.15 |

UNIT: mm

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2011-001600 filed in Japan on Jan. 7, 2011.

BACKGROUND OF THE INVENTION

1. Field of the Invention

The present invention relates to an optical scanning device and an image forming apparatus.

2. Description of the Related Art

An image forming apparatuses using a laser has been in widespread use for electrophotographic image recording. Generally in this case, the image forming apparatus includes an optical scanning device which scans a drum (hereinafter, referred to as a "photosensitive drum"), which is photosensitive, by sending a laser light beam to the photosensitive drum using a light deflector in the axial direction of the photosensitive drum while rotating the photosensitive drum so that a latent image is formed on a surface of the photosensitive drum.

Recently, with respect to the image forming apparatus, in order to obtain a colored output image, a tandem type image forming apparatus having a plurality of (generally, four) photosensitive drums has been used. In addition, an image forming apparatus which has a high quality image and a small size has been highly in demand.

For example, Japanese Patent Application Laid-open No. 2007-010797 discloses an oblique incidence type optical scanning device for correcting the color differences in a color image caused by the occurrence of a scan line curvature due to a change in temperature. In the optical scanning device, a light beam which is deflected from the same deflecting and reflecting surface of a light deflector among light beams emitted from a plurality of light source units is incident from both sides in a sub-scanning direction interposing a normal line of a deflecting and reflecting surface. Further, an even number of reflecting mirrors in the sub-scanning direction are disposed on an optical path of the light beam, which is incident from one side in the sub-scanning direction with respect to the normal line of the deflecting and reflecting surface and is deflection-reflected, extending from the deflecting and reflecting surface to the corresponding scanned surface. Still further, an odd number of reflecting mirrors in the sub-scanning direction are disposed on an optical path of the light beam, which is incident from the opposite side in the sub-scanning direction with respect to the normal line of the deflecting and reflecting surface and is deflection-reflected, extending from the deflecting and reflecting surface to the corresponding scanned surface.

In addition, Japanese Patent Application Laid-open No. 2005-153347 discloses an optical scanning device for reducing the color difference without increasing an optical path length of a scanning optical system. The optical scanning device includes a plurality of optical housings arranged to be thermally insulated from each other. Each optical housing encloses a light source, a light deflecting unit having a deflecting and reflecting surface which deflects a light beam emitted from the light source, and a scanning optical system which focuses the light beam deflected by the light deflecting unit on a scanned surface. In the optical scanning device, the scanning directions of a plurality of light beams emitted from the optical housings are the same.

In addition, Japanese Patent Application Laid-open No. 2006-267398 discloses a scanning optical apparatus for reducing an interval of photosensitive members when a plurality of the photosensitive members are provided. In the scanning optical apparatus, a focusing optical unit is configured to include a plurality of reflecting mirrors and at least one lens having fθ characteristics. The reflecting mirrors reflect a light beam deflection-scanned from a rotating polygon mirror in a direction in which the light beam travels away from the photosensitive members and then cause the light beam to enter the photosensitive members. The lens is adapted to receive the light beam deflection-scanned from the rotating polygon mirror. The focusing optical unit for a plurality of light beams reflected from the same reflecting surface of the rotating polygon mirror is disposed at a position, including at position on the light beam, between the light beam, which has been passed through a gap between the rotating polygon mirror and the lens and has been reflected toward a photosensitive member, and the light beam, which has been reflected toward another photosensitive member, among a plurality of the light beams reflected from the same reflecting surface of the rotating polygon mirror.

In addition, Japanese Patent Application Laid-open No. 2008-299051 discloses an optical scanning device for configuring the whole apparatus in a compact size. In the optical scanning device, a light beam deflection-scanned by a deflecting plane is incident to at least one focusing optical device constituting a focusing optical system to pass through the focusing optical device; after the light beam is reflected by at least one reflecting optical device, the light beam is incident from the direction opposite to the incidence direction in an optical axis direction of the focusing optical system to pass through the focusing optical device; and at least two light beams deflection-scanned by a different deflecting plane of a deflecting unit pass through the focusing optical device again to intersect each other in a sub scan cross section.

However, in the optical scanning device disclosed in Japanese Patent Application Laid-open No. 2007-010797, in the opposite scan type, the scan direction of one side optical system and the scan direction of the other side optical system are opposite to each other, and the direction of the position difference with respect to the main-scanning direction becomes the opposite direction. Therefore, although the timing to start writing (hereinafter, simply referred to as a "write starting timing") is controlled based on an output signal of a synchronization sensor, in the case where the light incident to the synchronization sensor passes through the lens, the change in temperature in the one side optical system is not necessarily the same as the change in temperature of the other side optical system. Accordingly, although a deviation may occur between the write starting timing of the one side and the write starting timing of the other side, there is a problem in that a difference occurs. This negatively influences the quality of an image in the color difference in the main-scanning direction.

In addition, in the optical scanning device disclosed in Japanese Patent Application Laid-open No. 2005-153347, in a case in which a write unit is divided into two write units, a temperature distribution in one unit or corresponding lens arrangement is not taken into consideration.

In addition, in the scanning optical apparatus disclosed in Japanese Patent Application Laid-open No. 2006-267398, there is a problem in that the scanning optical apparatus is configured to be thick. In addition, in the opposite scan type, the scan line curvatures of the one side and the scan line curvature of the other side are opposite to each other, so that there is a problem in that a color difference can occur.

In addition, in the optical scanning device disclosed in Japanese Patent Application Laid-open No. 2008-299051, since the scanning lens is disposed to be close to the polygon mirror, there is a problem in that the apparatus may be greatly influenced by a change in temperature.

There is a need to implement an apparatus which has small dimensions in both height and width and to reduce the deterioration in optical characteristics caused by a change in temperature.

Also, there is a need to implement a small-sized apparatus and to form a high quality image.

SUMMARY OF THE INVENTION

It is an object of the present invention to at least partially solve the problems in the conventional technology.

An optical scanning device that scans at least four scanned surfaces with light beams in a main-scanning direction. The optical scanning device includes: first and second light deflectors, each including a plurality of reflecting surfaces rotating around an axis and receiving two light beams on a same reflecting surface in an oblique incidence manner with respect to a sub-scanning direction; first and second scanning optical systems, each guiding two light beams deflected by the first light deflector to the corresponding scanned surface; and third and fourth scanning optical systems, each guiding two light beams deflected by the second light deflector to the corresponding scanned surface. Each of the four scanning optical systems has an optical plane that has the strongest sub-scanning direction power. The light deflector located in the vicinity of the optical plane having the strongest sub-scanning direction power in the first scanning optical system is the first light deflector. The light deflector located in the vicinity of the optical plane having the strongest sub-scanning direction power in the second scanning optical system is the second light deflector. All the optical planes having the strongest sub-scanning direction power are located under shaft bearings of the neighboring light deflectors in the vertical direction, respectively.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram (4) illustrating a configuration of the optical scanning device of FIG. 1;

FIG. 7 is a diagram illustrating a shape of each optical plane of a first scanning lens;

FIG. 8 is a diagram illustrating a shape of each optical plane of a second scanning lens;

DETAILED DESCRIPTION OF THE PREFERRED EMBODIMENTS

Figure 1:
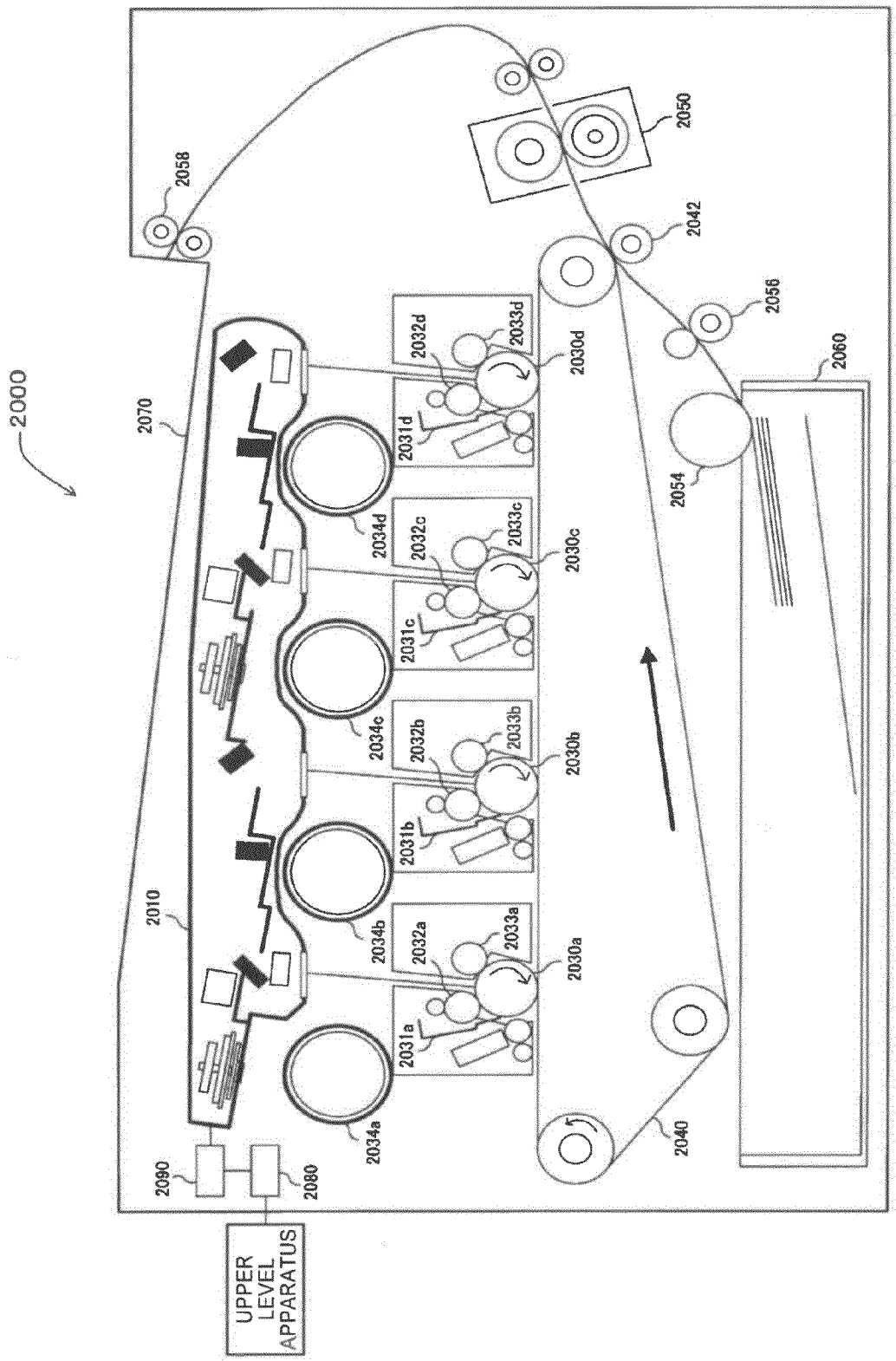
FIG. 1 is a diagram illustrating a schematic configuration of a color printer according to an embodiment of the present invention.
Figure 2:
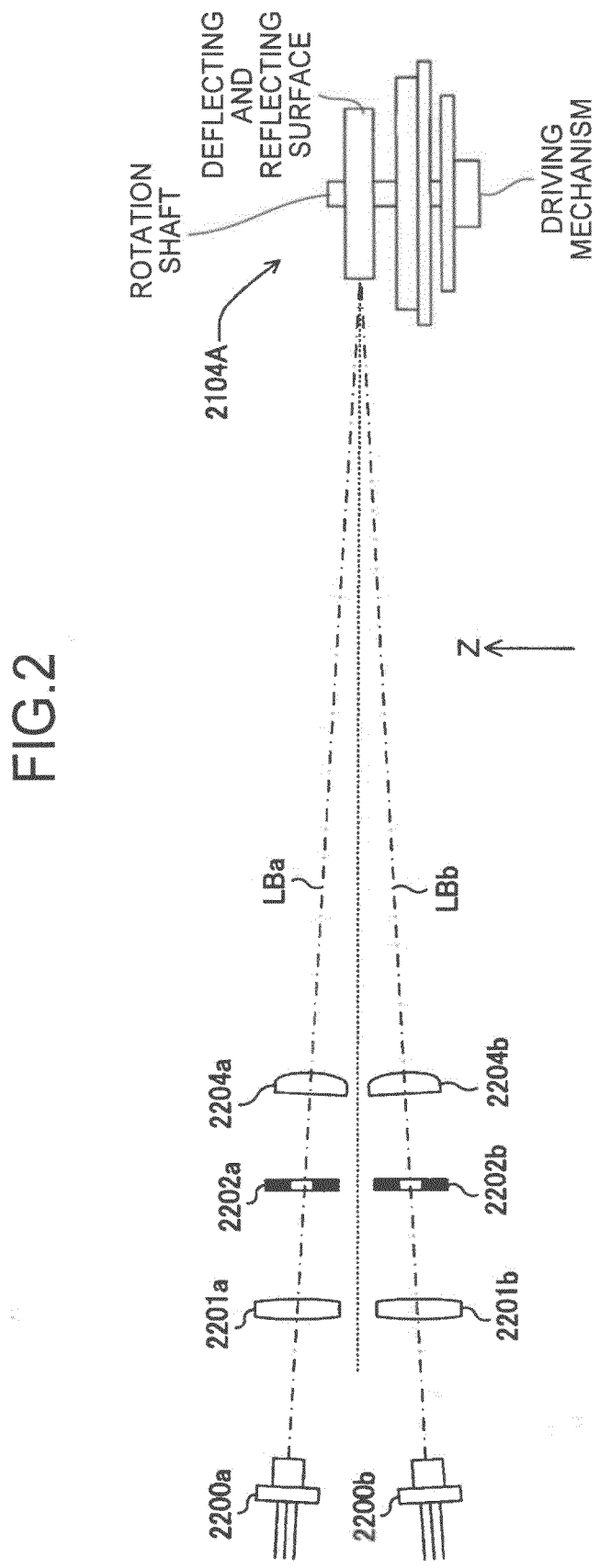
FIG. 2 is a diagram (1) illustrating a configuration of an optical scanning device of FIG. 1.
Figure 3:
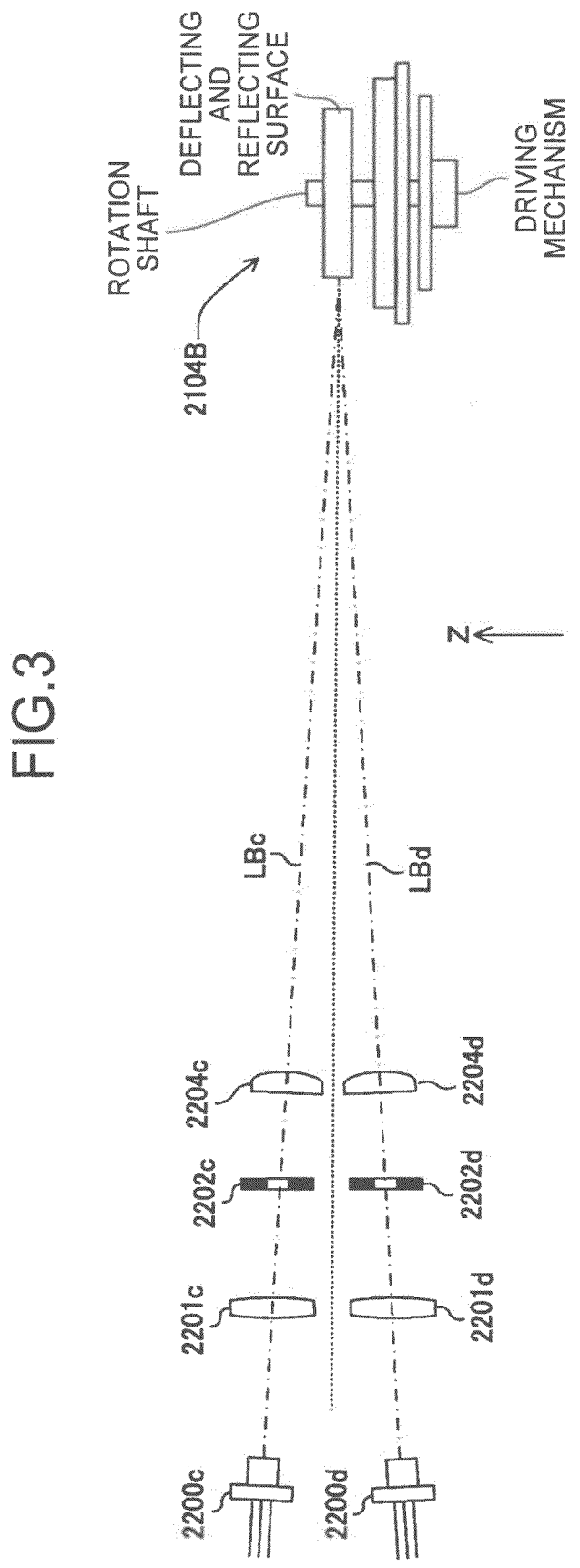
FIG. 3 is a diagram (2) illustrating a configuration of the optical scanning device of FIG. 1.
Figure 4:
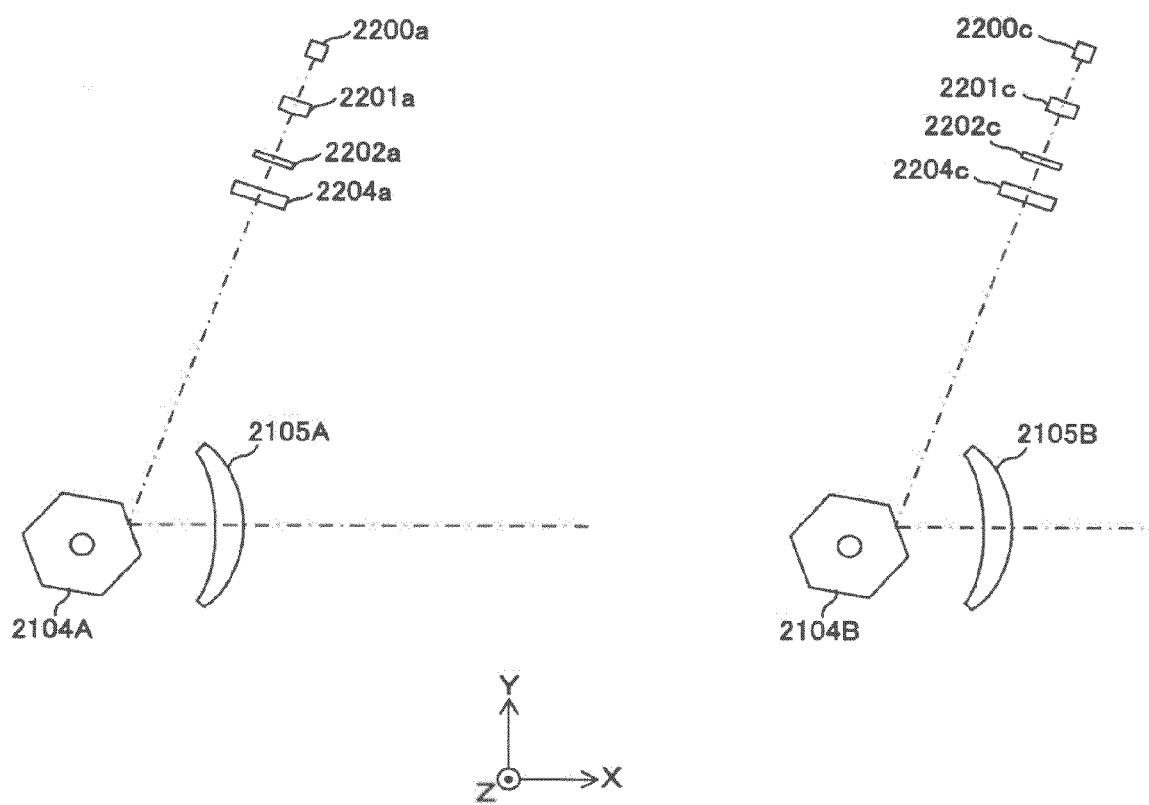
FIG. 4 is a diagram (3) illustrating a configuration of the optical scanning device of FIG. 1.

Hereinafter, embodiments of the present invention will be described with reference to FIGS. 1 to 13. FIG. 1 illustrates a schematic configuration of a color printer 2000 according to an embodiment.

The color printer 2000 a tandem type multi-color printer which forms a full-colored image by overlapping four colors (black, cyan, magenta, and yellow). The color printer 2000 includes an optical scanning device 2010, four photosensitive drums 2030a, 2030b, 2030c, and 2030d, four cleaning units 2031a, 2031b, 2031c, and 2031d, four charging units 2032a, 2032b, 2032c, and 2032d, four developing rollers 2033a, 2033b, 2033c, and 2033d, four toner cartridges 2034a, 2034b, 2034c, and 2034d, a transfer belt 2040, a transfer roller 2042, a fixing unit 2050, a feed roller 2054, a resist roller pair 2056, a discharge roller 2058, a feed tray 2060, a discharge tray 2070, a communication control unit 2080, a printer control unit 2090, and the like.

The communication control unit 2080 controls bidirectional communication with an upper level apparatus (for example, a PC) through a network or the like.

The printer control unit 2090 includes a CPU, a ROM which stores a program described with codes which can be decoded by the CPU and various data used for executing the program, a RAM as a working memory, an AD converting circuit which converts analog data into digital data, and the like. The printer control unit 2090 controls components in response to a request from the upper level apparatus and transmits image information from the upper level apparatus to the optical scanning device 2010.

The photosensitive drum 2030a, the charging unit 2032a, the developing roller 2033a, the toner cartridge 2034a, and the cleaning unit 2031a are used as a set and constitute an image forming station (hereinafter, for the convenience of description, referred to as a "K station") which forms a black image.

The photosensitive drum 2030b, the charging unit 2032b, the developing roller 2033b, the toner cartridge 2034b, and the cleaning unit 2031b are used as a set and constitute an image forming station (hereinafter, for the convenience of description, referred to as a "C station") which forms a cyan image.

The photosensitive drum 2030c, the charging unit 2032c, the developing roller 2033c, the toner cartridge 2034c, and the cleaning unit 2031c are used as a set and constitute an image forming station (hereinafter, for the convenience of description, referred to as an "M station" which forms a magenta image.

The photosensitive drum 2030d, the charging unit 2032d, the developing roller 2033d, the toner cartridge 2034d, and the cleaning unit 2031d are used as a set and constitute an image forming station (hereinafter, for the convenience of description, referred to as a "Y station") which forms a yellow image.

In each of the photosensitive drums, a photosensitive layer is formed on the surface thereof. In other words, the surface of each photosensitive drum becomes each scanned surface. In addition, each of the photosensitive drums is rotated in the direction of the arrow on the surface of FIG. 1 by a rotation mechanism (not shown).

Each of the charging units uniformly charges the surface of each photosensitive drum.

The optical scanning device 2010 illuminates the charged surfaces of the photosensitive drums with the corresponding light beams, which are modulated for the colors, based on multi-colored image information (black image information, cyan image information, magenta image information, and yellow image information) from the upper level apparatus. Therefore, electric charges are removed in a portion of the surface of each photosensitive drum which is illuminated with light, so that a latent image corresponding to each image information is formed on the surface of each photosensitive drum. Herein, the formed latent image is moved toward the corresponding developing unit according to rotation of the photosensitive drum. In addition, the configuration of the optical scanning device 2010 will be described later.

The toner cartridge 2034a contains black toner, and the toner is supplied to the developing roller 2033a. The toner cartridge 2034b contains cyan toner, and the toner is supplied to the developing roller 2033b. The toner cartridge 2034c contains magenta toner, and the toner is supplied to the developing roller 2033c. The toner cartridge 2034d contains yellow toner, and the toner is supplied to the developing roller 2033d.

The surface of each developing roller is coated uniformly and thinly with the toner from the corresponding toner cartridge according to the rotation thereof. Next, when the toner on the surface of each developing roller comes in contact with the surface of the corresponding photosensitive drum, development is performed only on the portion of the surface which is illuminated with light, so that the toner is attached only to that portion. In other words, each the developing roller performs the development by attaching the toner to the latent image formed on the surface of the corresponding photosensitive drum. Herein, the image (toner image) where the toner is attached is moved in the direction of the transfer belt 2040 according to the rotation of the photosensitive drum. The toner images of yellow, magenta, cyan, and black are sequentially transferred to the transfer belt 2040 at a predetermined timing to overlap each other, so that a multi-color image is formed.

Recording sheet is stored in the feed tray 2060. The feed roller 2054 is disposed in the vicinity of the feed tray 2060. The feed roller 2054 extracts the recording sheet from the feed tray 2060 sheet by sheet and conveys the recording sheet to the resist roller pair 2056. The resist roller pair 2056 transports the recording sheet toward a gap (interval) between the transfer belt 2040 and the transfer roller 2042 at a predetermined timing. Therefore, the color image on the transfer belt 2040 is transferred to the recording sheet. Herein, the transferred recording sheet is transported to the fixing unit 2050.

In the fixing unit 2050, heat and pressure are applied to the recording sheet, so that the toner is fixed on the recording sheet. Herein, the fixed recording sheet sheets are transported through the discharge roller 2058 to the discharge tray 2070 to be sequentially stacked on the discharge tray 2070.

Each cleaning unit removes the toner (residual toner) remaining on the surface of the corresponding photosensitive drum. The surface of the photosensitive drum from which the residual toner is removed is allowed to return to the position facing the corresponding charging unit.

Next, the configuration of the optical scanning device 2010 will be described.

As an example, as illustrated in FIGS. 2 to 5, the optical scanning device 2010 includes four light sources 2200a, 2200b, 2200c, and 2200d, four coupling lenses 2201a, 2201b, 2201c, and 2201d, four aperture plates 2202a, 2202b, 2202c, and 2202d, four cylindrical lenses 2204a, 2204b, 2204c, and 2204d, two polygon mirrors 2104A and 2104B, two first scanning lenses 2105A and 2105B, six folding mirrors 2106a, 2106b, 2106c, 2106d, 2107a, and 2107c, four second scanning lenses 2108a, 2108b, 2108c, and 2108d, four dust-proof glasses 2110a, 2110b, 2110c, and 2110d, a scanning control unit (not shown), and the like. The components may be assembled at predetermined positions of an optical housing 2300 (not shown in FIGS. 2 to 4; refer to FIG. 5).

In addition, herein, in the three-dimensional XYZ perpendicular coordinate system, the direction along the longitudinal direction of each photosensitive drum is set to the Y axis direction, and the direction parallel to the rotation shaft of each polygon mirror is set to the Z axis direction. Therefore, the dimension of the optical housing 2300 in the vertical direction is the height, and the dimension in the direction perpendicular to the vertical direction and the Y axis direction is the width.

In addition, hereinafter, for the convenience of description, the direction corresponding to the main-scanning direction is simply referred to as a "main-scanning corresponding direction" and the direction corresponding to the sub-scanning direction is simply referred to as a "sub-scanning corresponding direction".

The light source 2200a and the light source 2200b are disposed at positions separated from each other in the sub-scanning corresponding direction (herein, the Z axis direction), and the light source 2200c and the light source 2200d are also disposed in a similar manner.

The light source 2200a and the light source 2200c are disposed at positions separated from each other in the X axis direction, and the light source 2200b and the light source 2200d are also disposed in a similar manner.

Figure 6A:
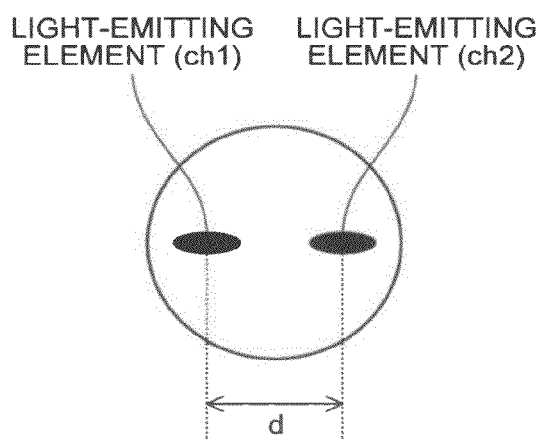
FIGS. 6A to 6C are diagrams illustrating an LD array included in each light source.

Each light source includes an LD (Laser Diode) array which has two light-emitting elements of which the oscillation wavelength is 659 nm (refer to FIG. 6A). The interval d between the two light-emitting elements is 30 μm. In addition, the diverging angle of the light beam of each light-emitting element is set to be 32° (full width at half maximum) in the horizontal direction and 8.5° (full width at half maximum) in the vertical direction when the two light-emitting elements are arrayed in the horizontal direction.

Figure 6B:
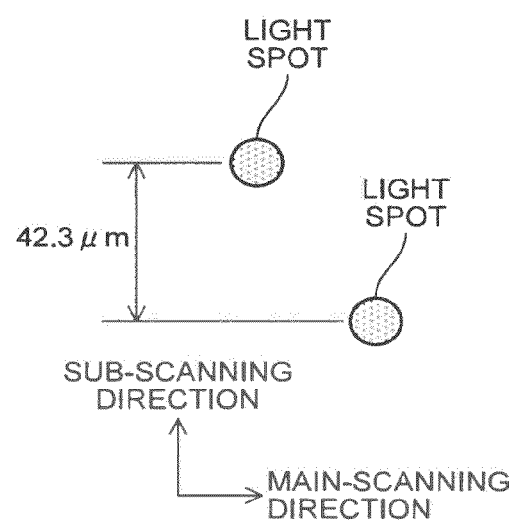
Figure 6C:
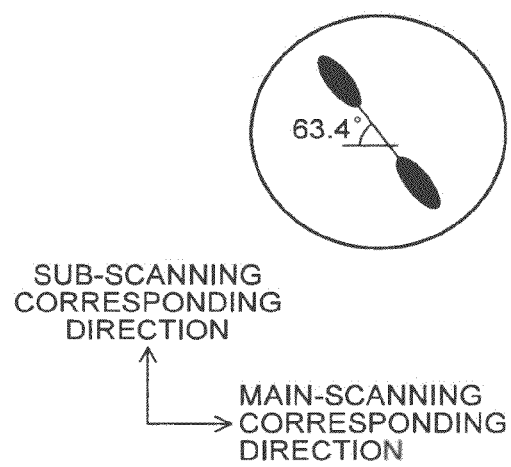

Each light source is capable of rotating around the axis which passes through approximately the center thereof and is parallel to the direction toward the polygon mirror, and rotation adjustment is performed so that the pixel density of the latent image formed on the surface of the photosensitive drum corresponds to 600 dpi, that is, so that the beam interval (beam pitch) on the surface of the photosensitive drum in the sub-scanning direction becomes about 42.3 μm (refer to FIG. 6B). Herein, the rotation adjustment is performed so that a line segment correcting the two light-emitting elements is oblique at an angle of 63.4° with respect to the main-scanning corresponding direction (refer to FIG. 6C).

The coupling lens 2201a is disposed on an optical path of a light beam (hereinafter, referred to as a "light beam LBa") emitted from the light source 2200a.

The coupling lens 2201b is disposed on an optical path of a light beam (hereinafter, referred to as a "light beam LBb") emitted from the light source 2200b.

The coupling lens 2201c is disposed on an optical path of a light beam (hereinafter, referred to as a "light beam LBc") emitted from the light source 2200c.

The coupling lens 2201d is disposed on an optical path of a light beam (hereinafter, referred to as a "light beam LBd") emitted from the light source 2200d.

Each coupling lens is a glass lens of which the focal length is 14.5 mm and of which the refractive index is 1.515 with respect to the light having a wavelength of 659 nm. The coupling lens converts a light beam from the corresponding light source into an approximately parallel light beam.

The aperture plate 2202a includes the aperture to shape the light beam LBa through the coupling lens 2201a.

The aperture plate 2202b includes the aperture to shape the light beam LBb though the coupling lens 2201b.

The aperture plate 2202c includes the aperture to shape the light beam LBc though the coupling lens 2201c.

The aperture plate 2202d includes the aperture to shape the light beam LBd though the coupling lens 2201d.

The aperture of each aperture plate is a rectangular or elliptical aperture of which the length is 2.84 mm in the main-scanning corresponding direction and of which the length is 0.90 mm in the sub-scanning corresponding direction (herein, the Z axis direction). In addition, the aperture plate is disposed so that the center of the aperture is located in the vicinity of the focus position of the corresponding coupling lens.

The cylindrical lens 2204a focuses the light beam LBa passing through the aperture of the aperture plate 2202a in the vicinity of the deflecting and reflecting surface of the polygon mirror 2104A in the Z axis direction.

The cylindrical lens 2204b focuses the light beam LBb passing through the aperture of the aperture plate 2202b in the vicinity of the deflecting and reflecting surface of the polygon mirror 2104A in the Z axis direction.

The cylindrical lens 2204c focuses the light beam LBc passing through the aperture of the aperture plate 2202c in the vicinity of the deflecting and reflecting surface of the polygon mirror 2104B in the Z axis direction.

The cylindrical lens 2204d focuses the light beam LBd passing through the aperture of the aperture plate 2202d in the vicinity of the deflecting and reflecting surface of the polygon mirror 2104B in the Z axis direction.

Each cylindrical lens is a glass lens of which the focal length is 87.8 mm and of which the refractive index is 1.514 with respect to the light having a wavelength of 659 nm.

The optical system including the coupling lens 2201a, the aperture plate 2202a, and the cylindrical lens 2204a is the pre-deflector optical system of the K station.

The optical system including the coupling lens 2201b, the aperture plate 2202b, and the cylindrical lens 2204b is the pre-deflector optical system of the C station.

The optical system including the coupling lens 2201c, the aperture plate 2202c, and the cylindrical lens 2204c is the pre-deflector optical system of the M station.

The optical system including the coupling lens 2201d, the aperture plate 2202d, and the cylindrical lens 2204d is the pre-deflector optical system of the Y station.

The polygon mirror 2104A and the polygon mirror 2104B are disposed at positions separated from each other in the X axis direction.

Each polygon mirror has six mirror planes which rotate around the axis, and each mirror plane becomes the deflecting and reflecting surface. In other words, each polygon mirror has six deflecting and reflecting surfaces. As seen from the top of the polygon mirror, the outer appearance of the six mirror planes is a regular hexagon which is inscribed in a circle having a radius of 13 mm.

In addition, the driving mechanism which drives the rotation of the six mirror planes is installed at the −Z side and includes a motor which rotates the rotation shaft of the six mirror planes. When the six mirror planes rotate, heat is generated from a shaft bearing of the driving mechanism. In other words, the shaft bearing becomes a heat source.

The light beam LBa from the cylindrical lens 2204a and the light beam LBb from the cylindrical lens 2204b are incident on the same deflecting and reflecting surface which is located at the +X side from the rotation center in the polygon mirror 2104A.

The light beam LBc from the cylindrical lens 2204c and the light beam LBd from the cylindrical lens 2204d are incident on the same deflecting and reflecting surface which is located at the +X side from the rotation center in the polygon mirror 2104B.

The light beam LBa from the cylindrical lens 2204a is incident on the deflecting and reflecting surface from the direction tilted by 2.5° at the +Z side with respect to the plane (XY plane) perpendicular to the rotation shaft of the polygon mirror 2104A.

The light beam LBb from the cylindrical lens 2204b is incident on the deflecting and reflecting surface from the direction tilted by 2.5° at the −Z side with respect to the plane perpendicular to the rotation shaft of the polygon mirror 2104A.

The light beam LBc from the cylindrical lens 2204c is incident on the deflecting and reflecting surface from the direction tilted by 2.5° at the +Z side with respect to the plane perpendicular to the rotation shaft of the polygon mirror 2104B.

The light beam LBd from the cylindrical lens 2204d is incident on the deflecting and reflecting surface from the direction tilted by 2.5° at the −Z side with respect to the plane perpendicular to the rotation shaft of the polygon mirror 2104B.

In addition, hereinafter, when a light beam is incident to the deflecting and reflecting surface, incidence in a direction oblique with respect to a surface perpendicular to the rotation angle of the polygon mirror is referred to as an "oblique incidence", and incidence in a direction parallel to a surface perpendicular to the rotation angle of the polygon mirror is referred to as a "horizontal incidence". In addition, the incidence angle in the case of the oblique incidence is referred to as an "oblique incidence angle".

In addition, the optical system configured with a light source and a pre-deflector optical system where a light beam is incident to the polygon mirror in an oblique manner is referred to as an "oblique incidence optical system".

The rotation shaft of each polygon mirror is configured to be oblique with respect to the vertical direction. The oblique angle is larger than the oblique incidence angle (herein, 2.5°), and herein, the oblique angle is set, as an example, to be 10°.

The first scanning lens 2105A is disposed on the optical paths of the light beam LBa and the light beam LBb which are deflected by the polygon mirror 2104A.

The first scanning lens 2105B is disposed on the optical paths of the light beam LBc and the light beam LBd which are deflected by the polygon mirror 2104B.

The folding mirror 2106a is disposed on the optical path of light beam LBa through the first scanning lens 2105A to return the optical path of light beam LBa in the −X direction.

The folding mirror 2107a is disposed on the optical path of light beam LBa through the folding mirror 2106a to return the optical path of light beam LBa in the direction toward the photosensitive drum 2030a.

The second scanning lens 2108a is disposed on the optical path of light beam LBa through the folding mirror 2107a.

The photosensitive drum 2030a is illuminated with the light beam LBa which is defected by the polygon mirror 2104A through the first scanning lens 2105A, the folding mirror 2106a, the folding mirror 2107a, the second scanning lens 2108a, and the dust-proof glass 2110a, so that the light spot is formed. The light spot is moved in the longitudinal direction of the photosensitive drum 2030a according to the rotation of the polygon mirror 2104A. In other words, the photosensitive drum 2030a is scanned with the light spot. The movement direction of the light spot is the "main-scanning direction" of the photosensitive drum 2030a, and the rotation direction of the photosensitive drum 2030a is the "sub-scanning direction" of the photosensitive drum 2030a.

The folding mirror 2106b is disposed on the optical path of light beam LBb through the first scanning lens 2105A to return the optical path of light beam LBb in the direction toward the photosensitive drum 2030b. The second scanning lens 2108b is disposed on the optical path of light beam LBb through the folding mirror 2106b.

The photosensitive drum 2030b is illuminated with the light beam LBb which is deflected by the polygon mirror 2104A through the first scanning lens 2105A, the folding mirror 2106b, the second scanning lens 2108b, and the dust-proof glass 2110b, so that the light spot is formed. The light spot is moved in the longitudinal direction of the photosensitive drum 2030b according to the rotation of the polygon mirror 2104A. In other words, the photosensitive drum 2030b is scanned with the light spot. The movement direction of the light spot is the "main-scanning direction" of the photosensitive drum 2030b, and the rotation direction of the photosensitive drum 2030b is the "sub-scanning direction" of the photosensitive drum 2030b.

The folding mirror 2106c is disposed on the optical path of light beam LBc through the first scanning lens 2105B to return the optical path of light beam LBc in the −X direction. The folding mirror 2107c is disposed on the optical path of light beam LBc through the folding mirror 2106c to return the optical path of light beam LBc in the direction toward the photosensitive drum 2030c. The second scanning lens 2108c is disposed on the optical path of light beam LBc through the folding mirror 2107c.

The photosensitive drum 2030c is illuminated with the light beam LBc which is deflected by the polygon mirror 2104B through the first scanning lens 2105B, the folding mirror 2106c, the folding mirror 2107c, the second scanning lens 2108c, and dust-proof glass 2110c, so that the light spot is formed. The light spot is moved in the longitudinal direction of the photosensitive drum 2030c according to the rotation of the polygon mirror 2104B. In other words, the photosensitive drum 2030c is scanned with the light spot. The movement direction of the light spot is the "main-scanning direction" of the photosensitive drum 2030c, and the rotation direction of the photosensitive drum 2030c is the "sub-scanning direction" of the photosensitive drum 2030c.

The folding mirror 2106d is disposed on the optical path of light beam LBd through the first scanning lens 2105B to return the optical path of light beam LBd in the direction toward the photosensitive drum 2030d.

The second scanning lens 2108d is disposed on the optical path of light beam LBd through the folding mirror 2106d.

The photosensitive drum 2030d is illuminated with the light beam LBd which is deflected by the polygon mirror 2104B through the first scanning lens 2105B, the folding mirror 2106d, the second scanning lens 2108d, and the dust-proof glass 2110d, so that the light spot is formed. The light spot is moved in the longitudinal direction of the photosensitive drum 2030d according to the rotation of the polygon mirror 2104B. In other words, the photosensitive drum 2030d is scanned with the light spot. The movement direction of the light spot is the "main-scanning direction" of the photosensitive drum 2030d, and the rotation direction of the photosensitive drum 2030d is the "sub-scanning direction" of the photosensitive drum 2030d.

The scan area of each photosensitive drum in the main-scanning direction where image information is written is referred to as an "effective scan area", an "image forming area", or an "effective image area".

The optical system disposed on the optical path between the polygon mirror and the photosensitive drum is referred to as a scanning optical system.

Herein, the scanning optical system of the K station is configured with the first scanning lens 2105A, the two folding mirrors 2106a and 2107a, and the second scanning lens 2108a.

In addition, the scanning optical system of the C station is configured with the first scanning lens 2105A, the folding mirror 2106b, and the second scanning lens 2108b.

In other words, the first scanning lens 2105A is shared by the two stations.

In addition, the scanning optical system of the M station is configured with the first scanning lens 2105B, the two folding mirrors 2106c and 2107c, and the second scanning lens 2108c.

In addition, the scanning optical system of the Y station is configured with the first scanning lens 2105B, the folding mirror 2106d, and the second scanning lens 2108d.

In other words, the first scanning lens 2105B is shared by the two stations.

Each first scanning lens is a resin lens of which the refractive index is 1.530 with respect to the light having a wavelength of 659 nm and of which the thickness is 5.2 mm at the center (on the optical axis) thereof.

Each second scanning lens is a resin lens of which the refractive index is 1.530 with respect to the light having a wavelength of 659 nm and of which the thickness is 3.0 mm at the center (on the optical axis) thereof.

The shape of each of the optical planes (incidence optical plane and emitting optical plane) of each scanning lens is expressed by the following Equations (1) and (2).

$$x(y, z) = \frac{y^2 \cdot Cm}{1 + \sqrt{1 - (1+K) \cdot (y \cdot Cm)^2}} + A \cdot y^4 + B \cdot y^6 + \quad (1)$$

$$C \cdot y^8 + D \cdot y^{10} + E \cdot y^{12} + F \cdot y^{14} + \frac{Cs(y) \cdot z^2}{1 + \sqrt{1 - (Cs(y) \cdot z)^2}}$$

$$Cs(y) = \frac{1}{Rz} + a \cdot y^2 + b \cdot y^4 + c \cdot y^6 + d \cdot y^8 \quad (2)$$

In the above Equations (1) and (2), the distance from the optical axis in the main-scanning corresponding direction is defined by y, and the distance from the optical axis in the sub-scanning corresponding direction is defined by z. In addition, a paraxial radium of curvature in a "main-scanning cross section" as a cross section which includes the optical axis and is parallel to the main-scanning corresponding direction is defined by Rm (=1/Cm), and a paraxial radium of curvature in a "sub-scanning cross section" which includes the optical axis and is perpendicular to the main-scanning cross section is defined by Rz. In addition, A, B, C, . . . are aspherical coefficients of the shape relating to the main-scanning corresponding direction, and a, b, c, are aspherical coefficients of the shape relating to the sub-scanning corresponding direction.

A specific example of the Rm, the Rz, and the coefficients (unit: mm) of each first scanning lens is illustrated in FIG. 7. In addition, a specific example of the Rm, the Rz, and the coefficients (unit: mm) of each second scanning lens is illustrated in FIG. 8. Herein, only the emitting optical plane of each second scanning lens has a power in the sub-scanning corresponding direction. In addition, the emitting optical plane of each second scanning lens is the optical plane having the strongest power in the sub-scanning corresponding direction.

Each second scanning lens is disposed at a lower portion in the vertical direction than the case where the rotation shaft of each polygon mirror is assumed not to be oblique.

In addition, the light deflector located in the vicinity of the optical plane having the strongest power in the sub-scanning corresponding direction in the K station is the light deflector 2104A, and the light deflector located in the vicinity of the optical plane having the strongest power in the sub-scanning corresponding direction in the C station is the light deflector 2104B.

In each station, the sub-scanning magnification ratio of the scanning optical system is –0.85. In addition, the design value of the size of the light spot on the surface of each photosensitive drum is configured so to be 65 μm in the main-scanning direction and 75 μm in the sub-scanning direction.

Each dust-proof glass is a glass plate of which the refractive index is 1.517 with respect to the light having a wavelength of 659 nm and of which the thickness is 1.9 mm.

Figure 9:
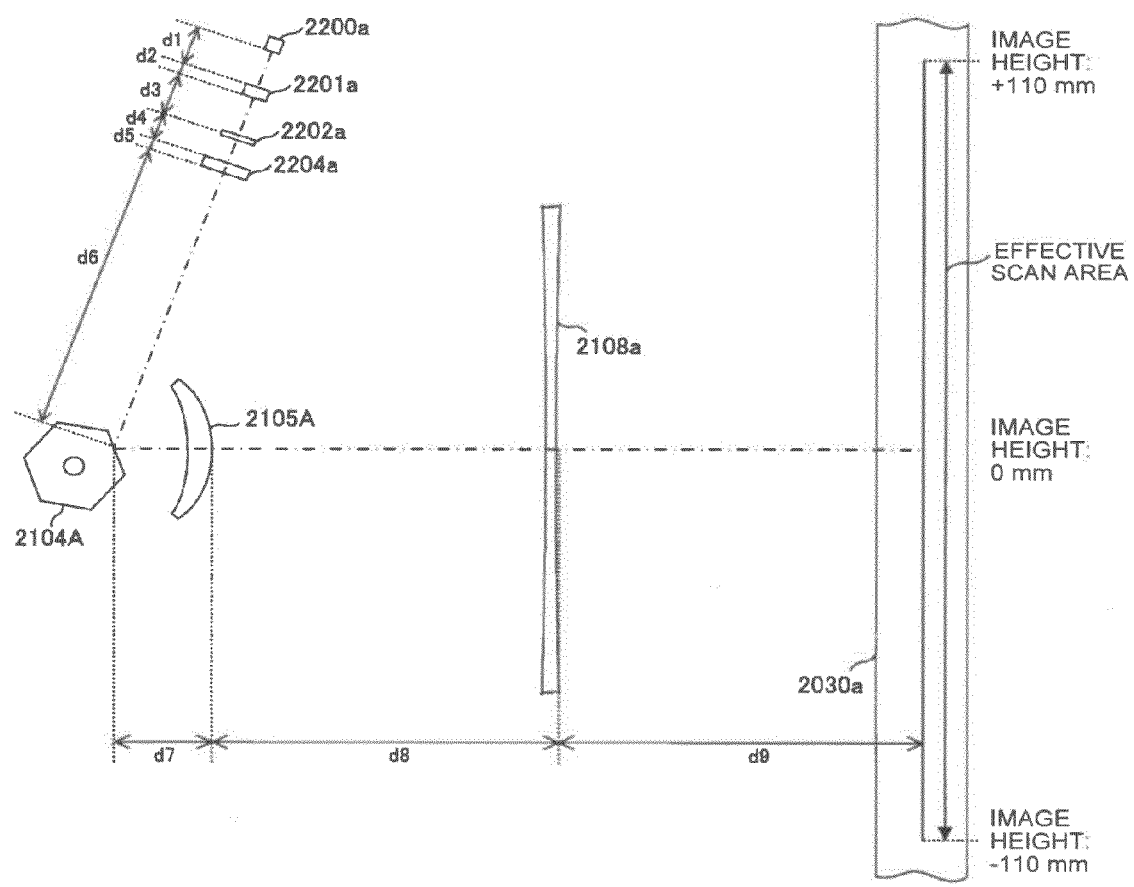
FIG. 9 is a diagram (1) illustrating an example of arrangement of main optical devices.
Figures 10, 11:
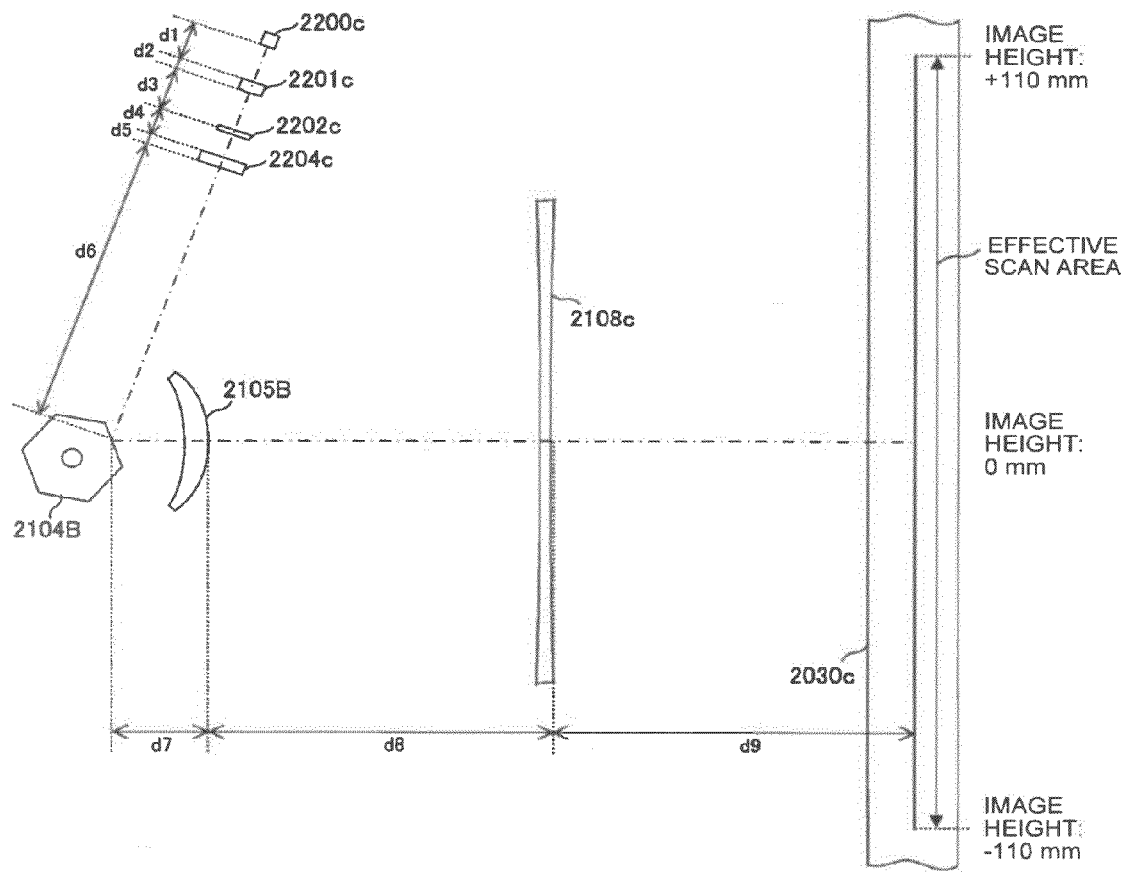
FIG. 10 is a diagram (2) illustrating an example of arrangement of main optical devices.
FIG. 11 is a diagram illustrating a specific example of d1 to d9 in FIGS. 9 and 10.

In addition, specific examples of arrangement positions of main optical devices are illustrated in FIGS. 9 to 11. In addition, a length of the effective scan area is 220 mm, and when the optical scanning is performed in the effective scan area, the rotation angle of each polygon mirror is 17.1° and a field angle is 34.2°. In addition, FIGS. 9 and 10 are schematic views where the optical paths are extended to be parallel to the paper surface, and the values d1 to d9 are the optical path lengths.

Figure 12:
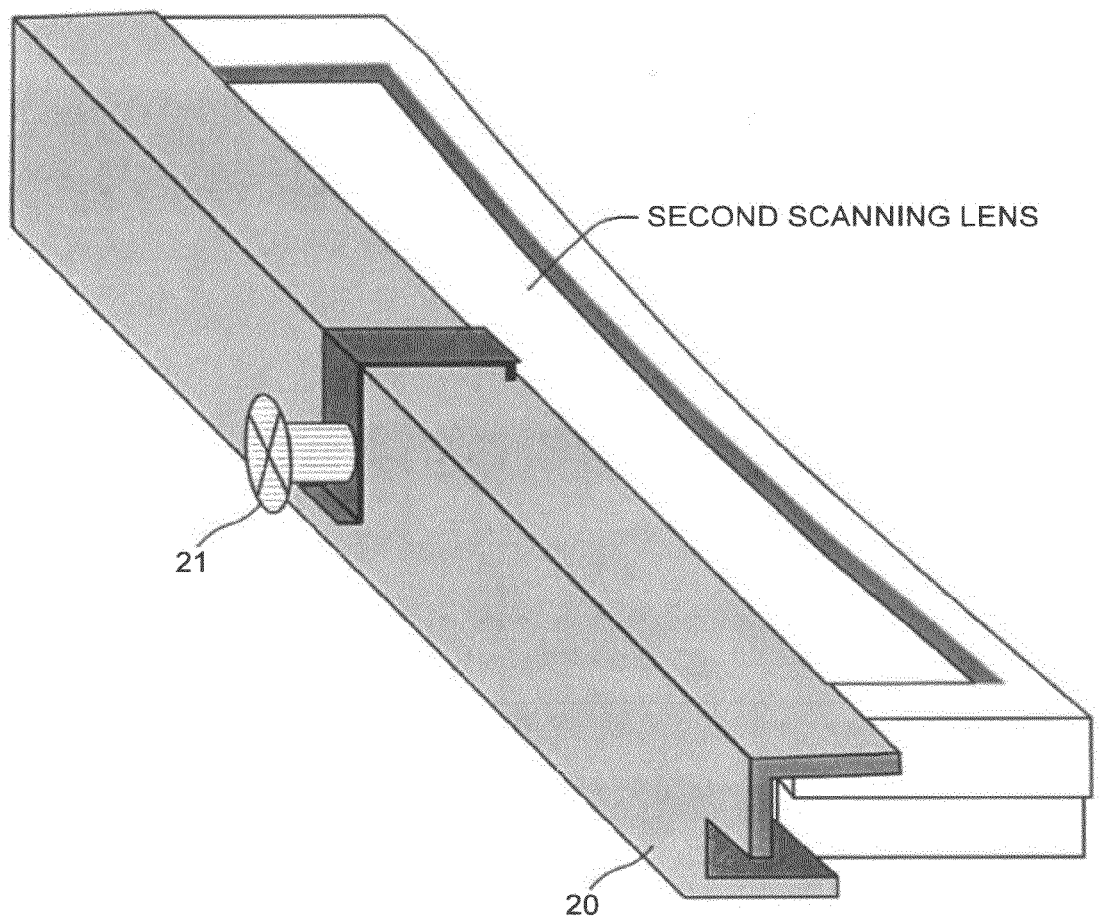
FIG. 12 is a diagram illustrating a metal plate member.

As an example, as illustrated in FIG. 12, each of the second scanning lenses is retained by a metal plate member 20. Since the metal plate member 20 has a higher thermal conductivity than a resin which is a material used for the second scanning lens, the metal plate member 20 also functions as a heat releasing member for suppressing a change in temperature of the second scanning lens. In addition, the metal plate member 20 is installed so that the end portion of at least one side in the longitudinal direction is exposed outside the optical housing 2300. Therefore, it is possible to further improve the heat releasing effect.

In addition, with respect to each second scanning lens, a deflection amount may be adjusted by a deflection adjusting screw 21. Therefore, it is possible to correct a scan line curvature on the corresponding photosensitive drum.

Figure 13:
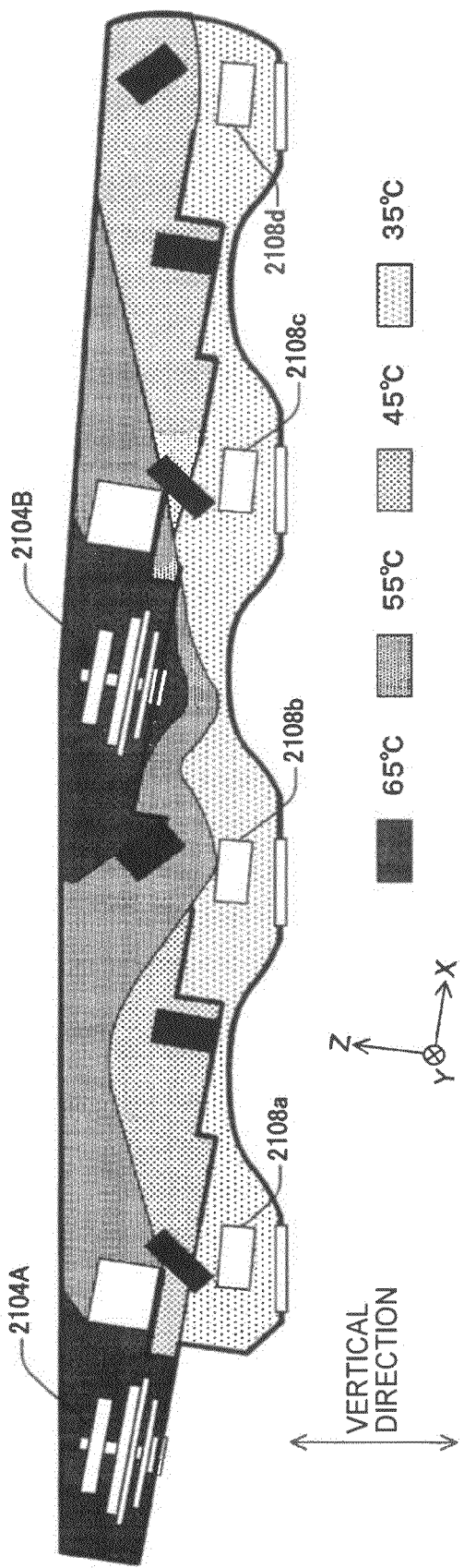
FIG. 13 is a diagram illustrating a temperature distribution in an optical housing.

FIG. 13 illustrates the results of a simulation of temperature distribution in the optical housing 2300 when the optical scanning device 2010 is continuously used for 10 minutes at room temperature (25° C.). Since each polygon mirror continuously rotates at a high speed, the shaft bearing thereof becomes a heat source, so that the temperature in the optical housing 2300 is increased. The temperature in the vicinity of each polygon mirror becomes 65° C. or more, and as you approach closer to the polygon mirror, the temperature rises. Although there is convection due to heat wind, the upper portion of the optical housing 2300 has a relatively high temperature, and the lower portion of the optical housing 2300 has a relatively low temperature.

If the temperature in the optical housing is greatly changed, the scanning lens made of a resin deforms due to thermal expansion, so that the size (spot diameter) of the light spot on the photosensitive drum or the position thereof in the sub-scanning direction is changed. In addition, hereinafter, for the convenience of description, the position of the light spot on the photosensitive drum in the sub-scanning direction is simply referred to as a "sub-scanning spot position," and the difference from a desired position is simply referred to as a "sub-scanning spot position difference".

Particularly, in the case where the oblique incidence optical system is used, the sub-scanning spot position difference can greatly occur due to the deformation of the scanning lens. In addition, the change in the sub-scanning spot position due to the change in temperature can occur because the optical plane which has a curvature in the sub-scanning corresponding direction is deformed. In the embodiment, the curvature in the sub-scanning corresponding direction is formed on only the emitting optical plane of each second scanning lens (refer to FIGS. 7 and 8). In addition, all the second scanning lenses are located at lower positions than the shaft bearings of the neighboring light deflectors in the vertical direction, so that each second scanning lens is not greatly influenced by the heat from each polygon mirror (refer to FIG. 13).

In addition, in the embodiment, the rotation shaft of each polygon mirror is configured to be oblique at an angle of 10° with respect to the vertical direction. Therefore, the distance between the polygon mirror 2104B and the second scanning lens 2108b is increased in the vertical direction, so that the second scanning lens 2108b is not easily influenced by the heat from the polygon mirror 2104B.

In addition, since the rotation shaft of each polygon mirror is configured to be oblique with respect to the vertical direction, interference of the polygon mirror 2104B and the folding mirror 2106b may be prevented. Therefore, the scanning optical systems of the K and C stations and the scanning optical systems of the M and Y stations can be configured to be close to each other, so that the width of the optical scanning device can be reduced.

As described above, the optical scanning device 2010 according to the embodiment includes the four light sources 2200a, 2200b, 2200c, and 2200d, the four pre-deflector optical systems, the two polygon mirrors 2104A and 2104B, the four scanning optical systems, and the like.

The light beam LBa from the light source 2200a and the light beam LBb from the light source 2200b are incident to the same reflecting surface of the polygon mirror 2104A to be oblique with respect to the sub-scanning corresponding direction.

The light beam LBc from the light source 2200c and the light beam LBd from the light source 2200d are incident to the same reflecting surface of the polygon mirror 2104B to be oblique with respect to the sub-scanning corresponding direction.

Each scanning optical system includes a first scanning lens and a second scanning lens through which the light beam is incident to the first scanning lens. The second scanning lens of each scanning optical system is disposed at the optically most downstream side in the scanning optical system and has the optical plane which has the strongest power in the sub-scanning corresponding direction. In addition, the optical plane of each of the second scanning lens, which has the strongest power in the sub-scanning corresponding direction, is located under the shaft bearings of the neighboring polygon mirrors in the vertical direction.

In order to implement a small sized optical scanning device, height reduction and width reduction may be performed. In the embodiment, the two-stage structure of the polygon mirror is changed into one-stage structure by using the oblique incidence optical system, so that the height of the optical scanning device is reduced. In addition, the optical scanning device is configured in a one-side scanning type by using two polygon mirrors, so that the width of the optical scanning device is reduced. In addition, in the case where the optical scanning device is configured in an opposite scan type by using one polygon mirror, the layout of the folding mirrors is necessarily treated in order to reduce the width. However, this configuration leads to an increase in height.

In the case of the oblique incidence, the scan line curvature on the photosensitive drum is large in comparison with the horizontal incidence. In addition, in the case where two polygon mirrors are used, there are two heat sources, so that the temperature in the device may be easily increased. In addition, if the scanning lens is deformed due to a change in temperature in the apparatus, the photosensitive drum is illuminated with light at the positions different from desired positions thereof, so that a color difference may occur in the output image. In addition, the portion having the highest temperature in the polygon mirror is the shaft bearing, and the heat of the shaft bearing is transported upwards in the vertical direction.

In the embodiment, each second scanning lens having the optical plane which has the strongest power in the sub-scanning corresponding direction is configured to be disposed at the lower side from the shaft bearing of each polygon mirror in the vertical direction, so that the heat of the shaft bearing of each polygon mirror is not easily transported to each second scanning lens. In this case, the scan line curvature or the scan line slope is suppressed, so that the color difference of the output image can be reduced.

In other words, an optical scanning device may be implemented, which has small dimensions in the height and width directions and has a small deterioration amount in the optical characteristics due to a change in temperature.

In addition, in each of the scanning optical systems, the second scanning lens is disposed at the optically lowermost stream side. In this case, a lateral magnification ratio (hereinafter, for the convenience of description, simply referred to as a "sub-scanning lateral magnification ratio") may be decreased with respect to the sub-scanning corresponding direction in each of the scanning optical systems. Therefore, it is possible to reduce the occurrence of curving of the scan line caused by a manufacturing error or installation positioning error of each optical part. In other words, each of scanning optical systems can be configured as scanning optical systems invulnerable to various types of errors.

In addition, in each of the scanning optical systems, since only the second scanning lens has power in the sub-scanning corresponding direction, it is possible to further decrease the sub-scanning lateral magnification ratio.

In addition, the rotation shaft of each polygon mirror is oblique with respect to the vertical direction, and the oblique angle is larger than the oblique incidence angle. In addition, each second scanning lens is disposed at a lower portion in the vertical direction than the case where the rotation shaft of each polygon mirror is assumed not to be oblique. In other words, the rotation shaft of each polygon mirror is oblique in the direction where the position of each folding mirror is shifted downward in the vertical direction. In this case, the light beam deflected by each polygon mirror is not directed upward from each polygon mirror in the vertical direction. In addition, the heat from the polygon mirror does not easily reach each second scanning lens. Therefore, it may be concurrently achieved to make the apparatus thinner and to reduce the scan line curvature.

In addition, since the light beam from each light source is incident to the corresponding polygon mirror in an oblique manner and is deflected by the same reflecting surface of the polygon mirror, it is possible to implement each polygon mirror with a small size and at a low cost.

In addition, in the color printer 2000 according to the embodiment, since the optical scanning device 2010 is included, it is possible to implement a small-sized color printer and to form an image having a high equality.

Figure 14:
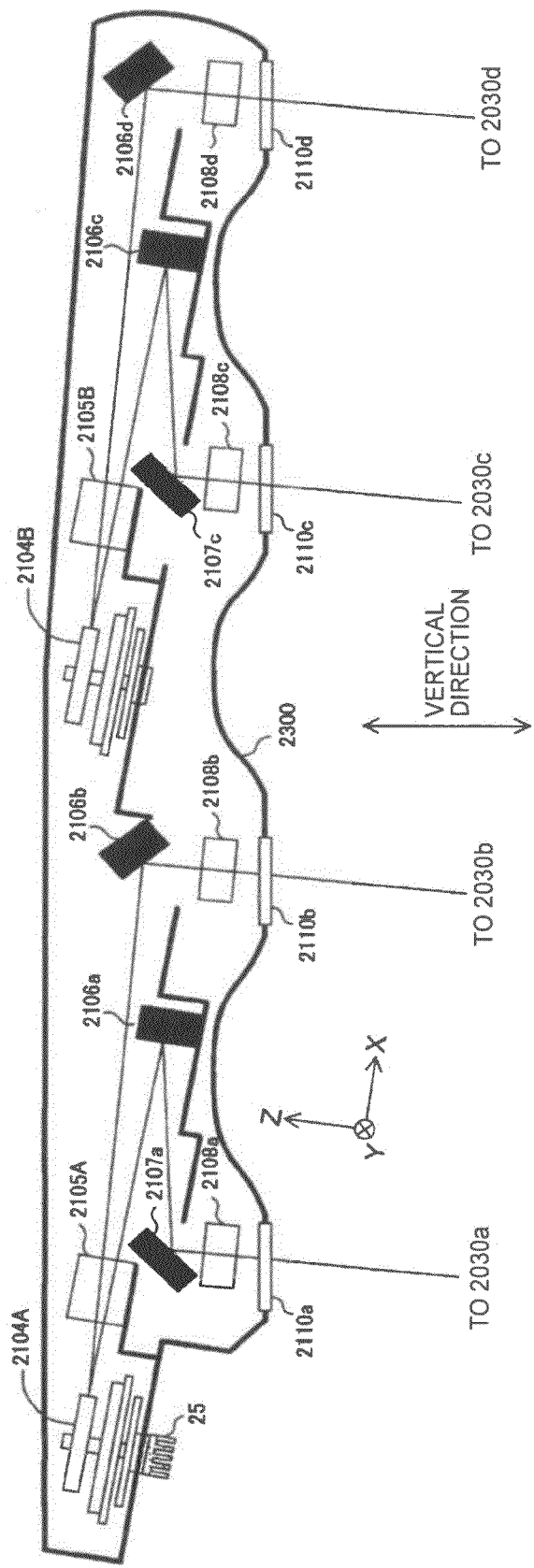
FIG. 14 is a diagram illustrating a heat releasing member.

In addition, in the embodiment, as illustrated in FIG. 14 as an example, in the case where each polygon mirror releases a large amount of heat, a heat releasing member 25 may be installed in the vicinity of the shaft bearing of the polygon mirror 2104A.

Figure 15:
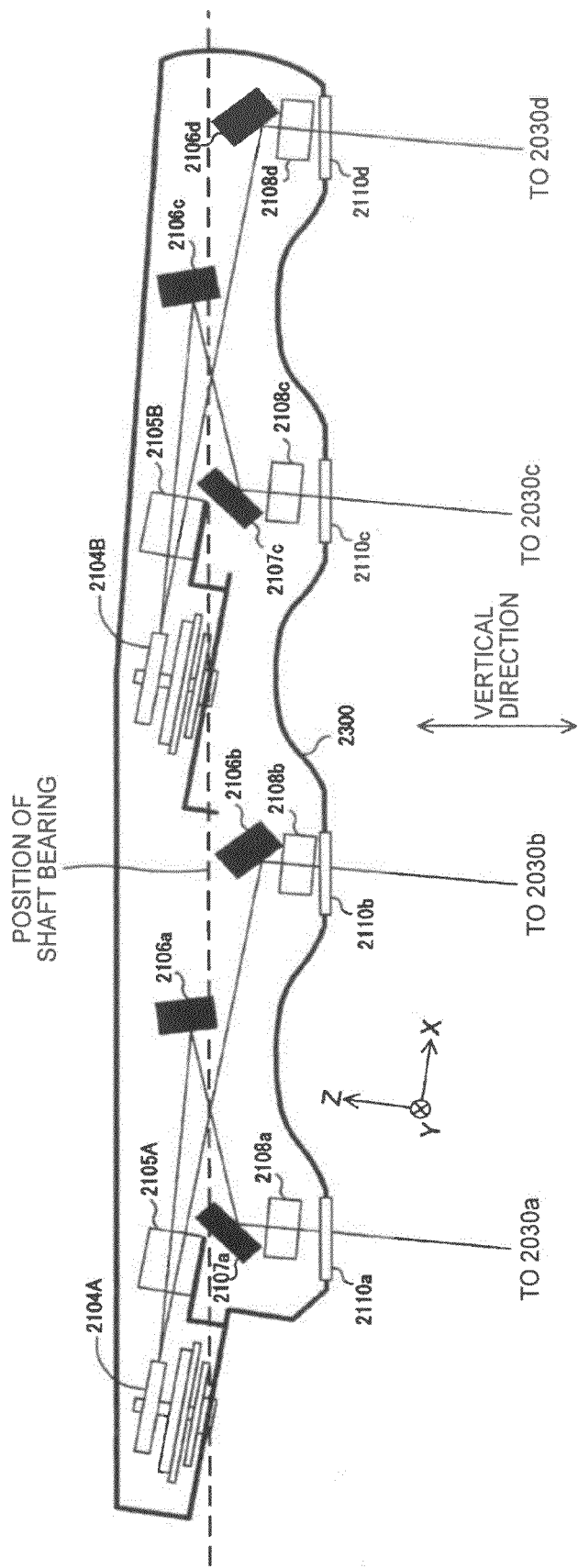
FIG. 15 is a diagram illustrating a first modified example of the optical scanning device.

In addition, in the embodiment, as illustrated in FIG. 15, the photosensitive drum 2030b may be scanned with the light beam LBa, and the photosensitive drum 2030a may be scanned with the light beam LBb. Similarly, the photosensitive drum 2030d may be scanned with the light beam LBc, and the photosensitive drum 2030c may be scanned with the light beam LBd. In this case, the folding mirror 2106b may be disposed under the shaft bearing of the polygon mirror 2104B with respect to the vertical direction. Therefore, it is possible to prevent deflection from occurring due to an increase in temperature of the folding mirror 2106b.

Figure 16:
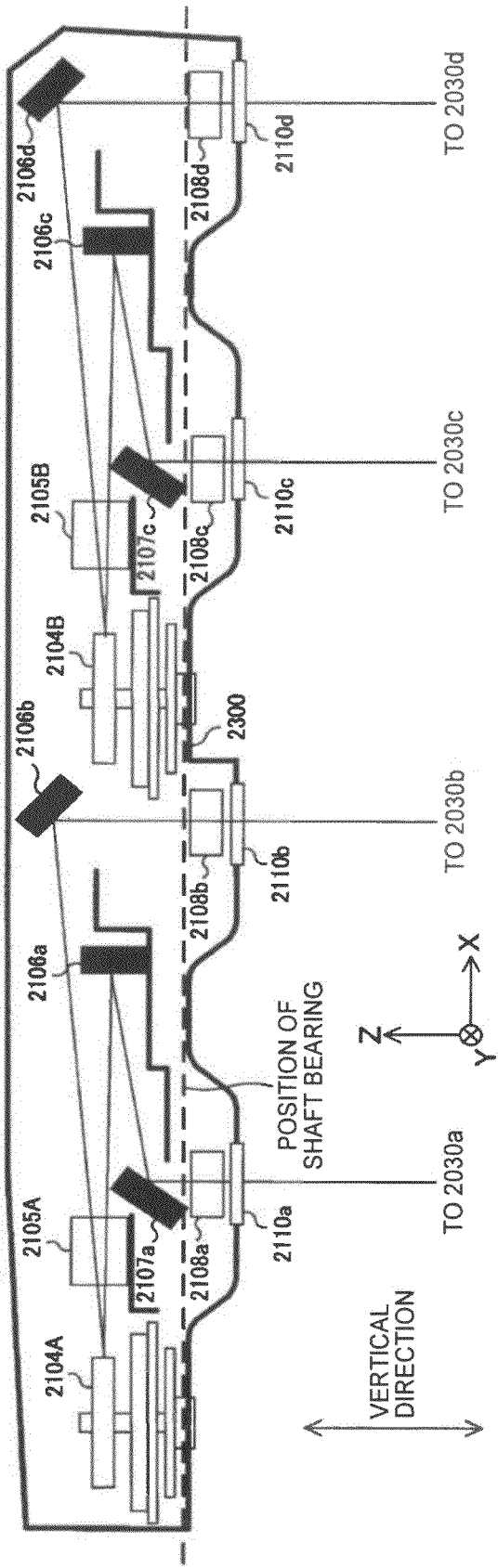
FIG. 16 is a diagram illustrating a second modified example of the optical scanning device.
Figure 17:
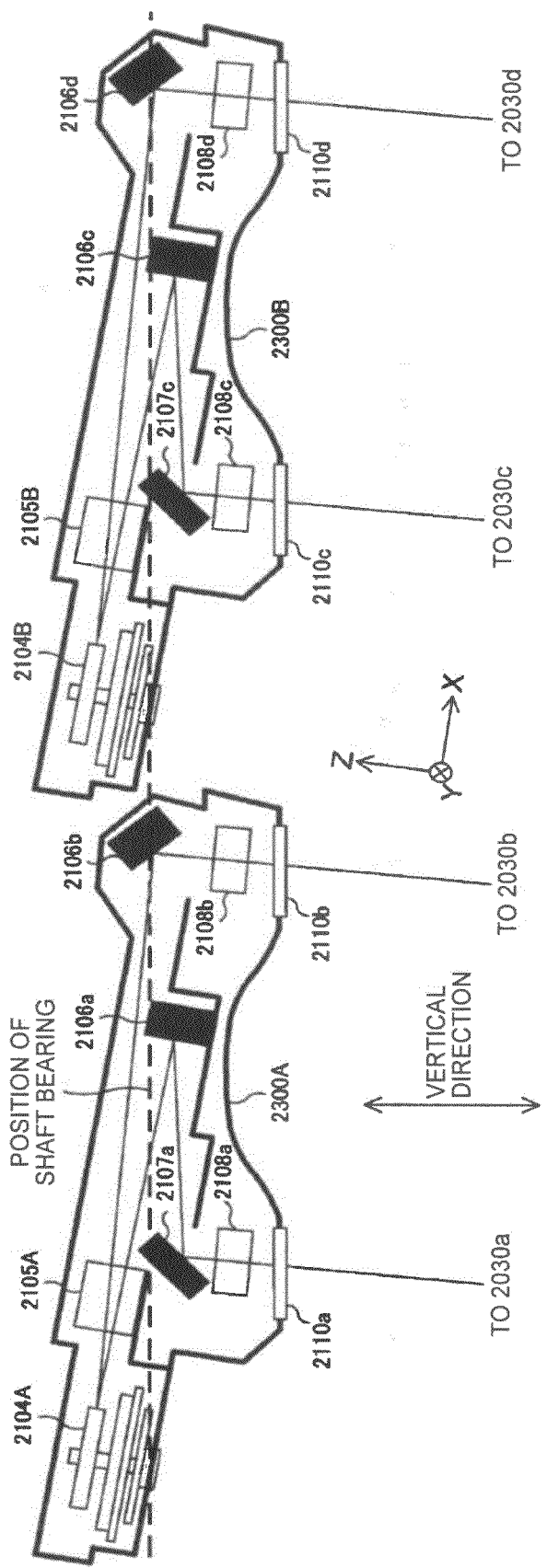
FIG. 17 is a diagram illustrating a third modified example of the optical scanning device.

In addition, in the embodiment, as illustrated in FIG. 16 as an example, in the case where each polygon mirror releases a relatively small amount of heat, the rotation shaft of each polygon mirror may not be configured to be oblique with respect to the vertical direction. The optical plane of each second scanning lens, which has the strongest power in the sub-scanning corresponding direction, is located under the shaft bearing of the neighboring polygon mirror in the vertical direction.

In addition, in the embodiment, although the case where all the optical members of the optical scanning device 2010 are retained in one optical housing 2300 is described, the invention is not limited thereto. For example, as illustrated in FIG.

17, the optical members relating to the K and C stations may be retained in an optical housing 2300A, and the optical members relating to the M and Y stations may be retained in an optical housing 2300B.

Figure 18:
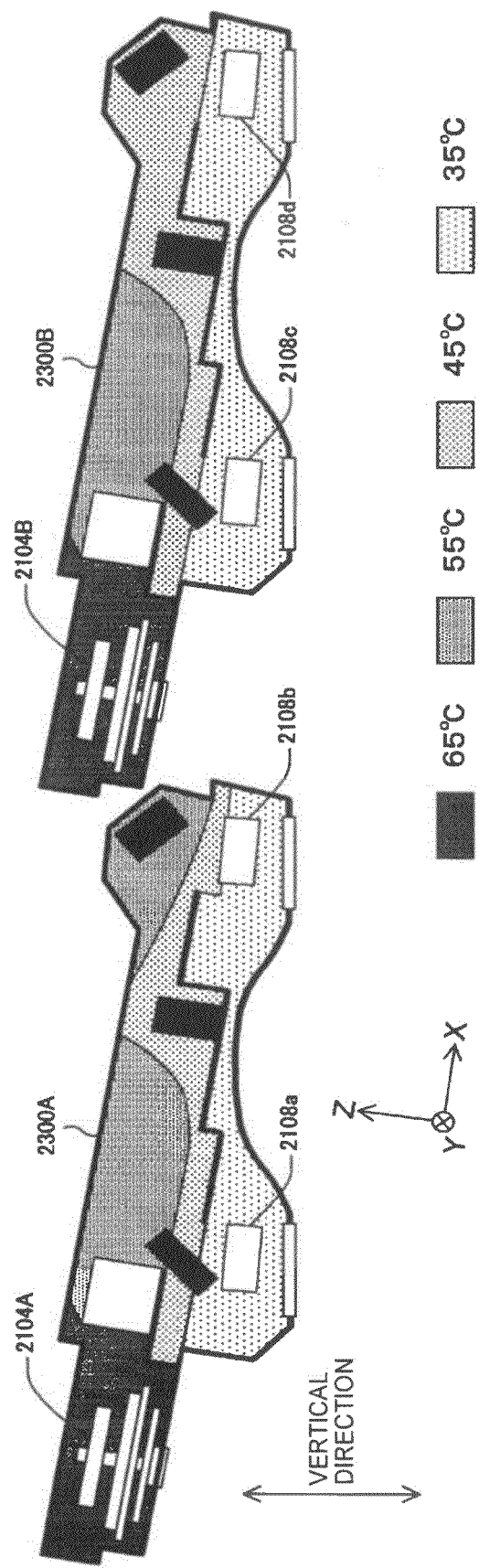
FIG. 18 is a diagram illustrating a temperature distribution in each optical housing in the third modified example.

In this case, FIG. 18 illustrates a result of a simulation of the temperature distribution in each optical housing when the optical scanning device is continuously used for 10 minutes. In this manner, the optical housing is divided into two parts, so that each optical housing is thermally separated from a different optical housing. Therefore, in comparison with the embodiment, since the influence of the polygon mirror 2104B to the second scanning lens 2108b is decreased, the temperature of the second scanning lens 2108b can be maintained at a lower temperature by about 3° C. than the case of the embodiment. In addition, in FIG. 18, it is difficult to understand the temperature distribution since it is indicated with a scale of 5° C. However, the result of simulation clearly illustrates that the temperature is decreased.

Figure 19:
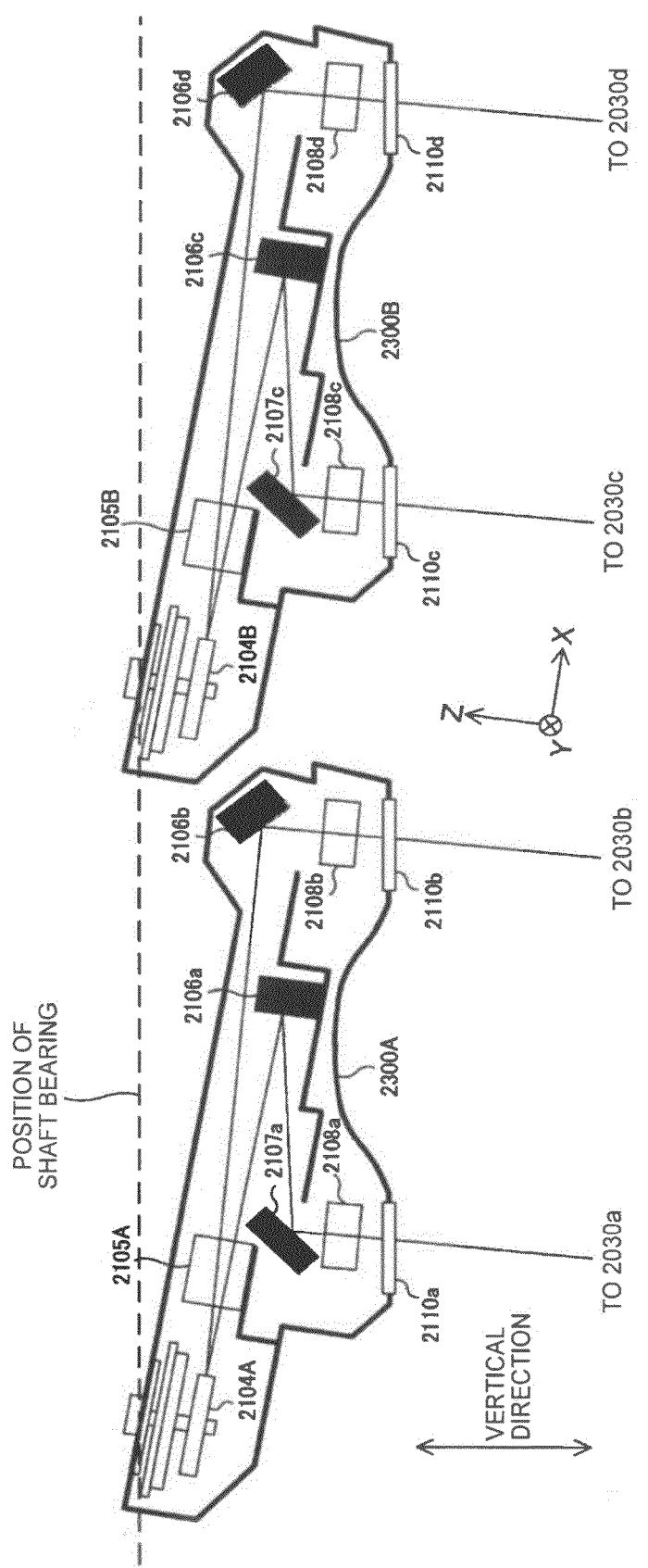
FIG. 19 is a diagram illustrating a fourth modified example of the optical scanning device.

In addition, as illustrated in FIG. 19, the driving mechanism of each polygon mirror may be disposed to be located at the +Z side. In this case, since the shaft bearing having the highest temperature in each polygon mirror can be attached at the upper portion of each optical housing, the increase in temperature in each optical housing may be suppressed to a minimum. In addition, either the polygon mirror 2104A or the polygon mirror 2104B may be disposed so that the driving mechanism is located at the +Z side.

Figure 20:
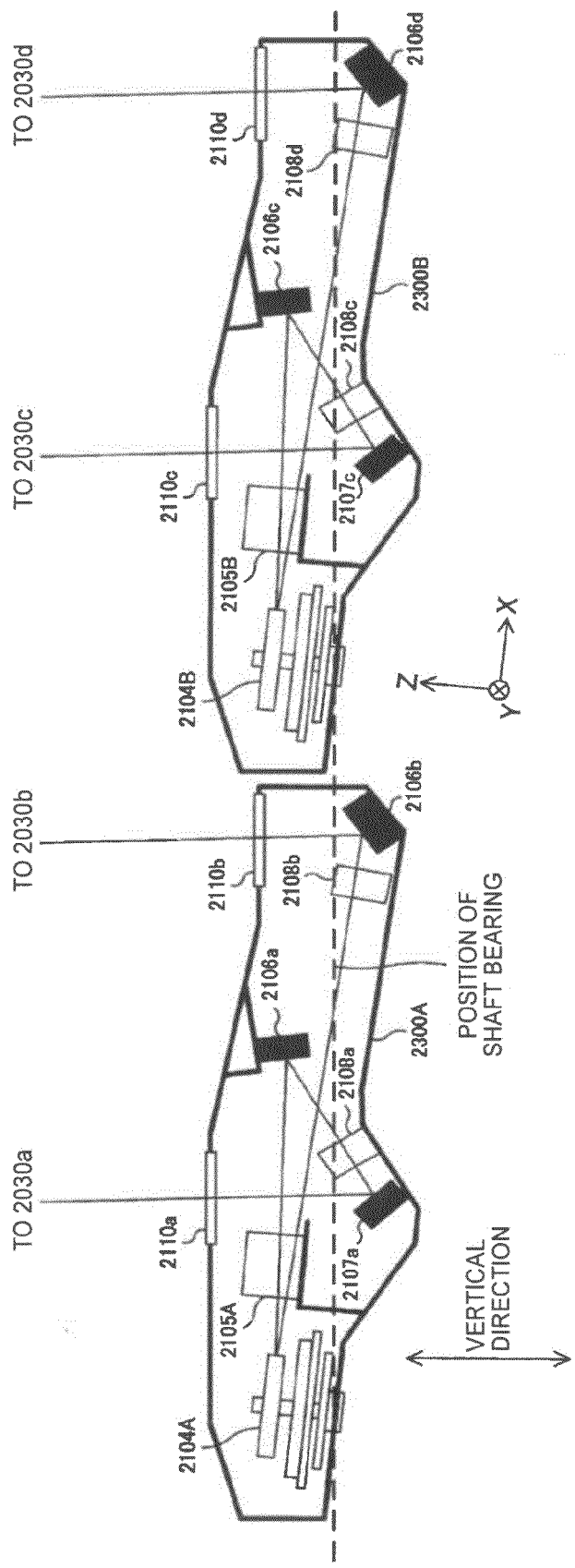
FIG. 20 is a diagram illustrating a fifth modified example of the optical scanning device.

In addition, in the embodiment, although the case where the optical scanning device is installed at the +Z side of the photosensitive drum is described, the invention is not limited thereto. The optical scanning device may be installed at the −Z side of the photosensitive drum. As an example, an optical scanning device which is very suitable for this case is illustrated in FIG. 20. Herein, the rotation shaft of each polygon mirror is oblique at an angle of about 7° with respect to the vertical direction.

Figure 21:
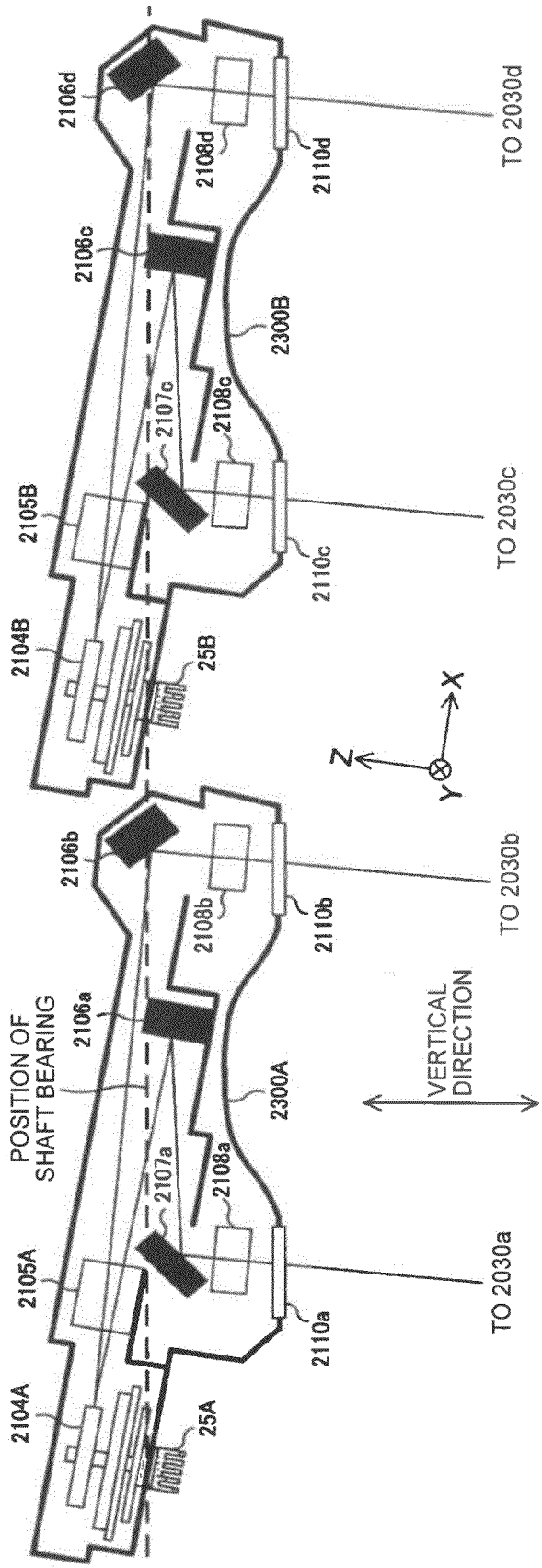
FIG. 21 is a diagram illustrating a heat releasing member.

In addition, as illustrated in FIG. 21, in the case where two optical housings are used, heat releasing members 25A and 25B may be installed in the respective polygon mirrors.

In addition, in the embodiment, although the case where the shaft bearing of the polygon mirror 2104A and the shaft bearing of the polygon mirror 2104B have the same position in the vertical direction is described, the invention is not limited thereto.

Figure 22:
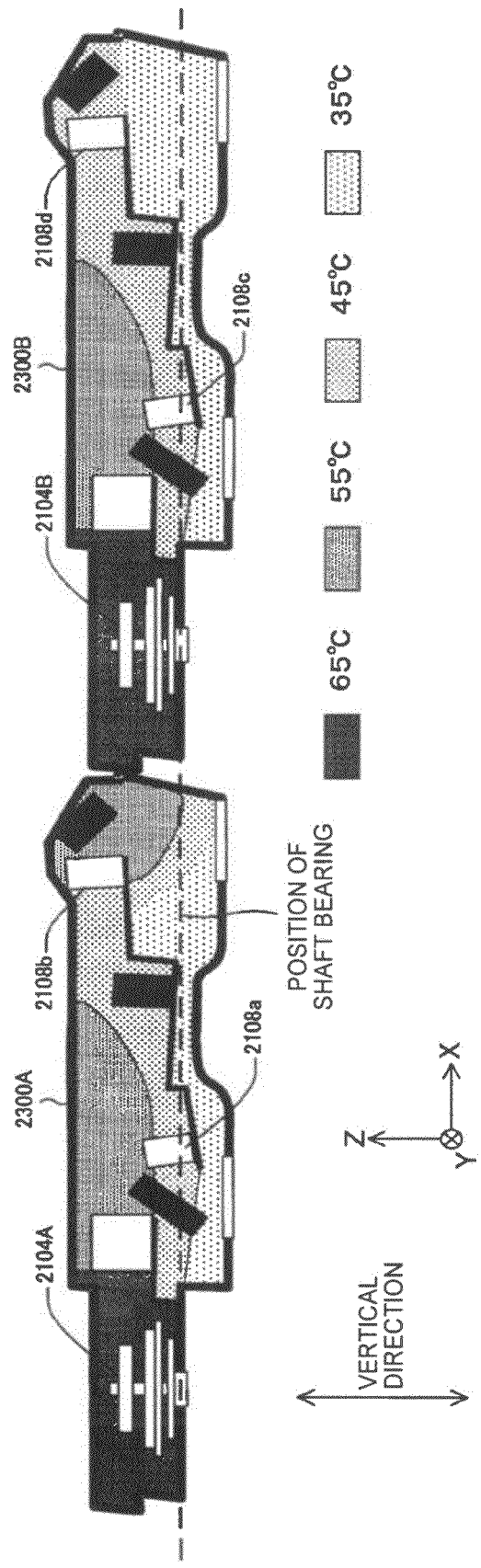
FIG. 22 is a diagram illustrating a temperature distribution in each optical housing in an optical scanning device according to Comparative Example 1.

FIG. 22 illustrates a result of a simulation of the temperature distribution in each optical housing when the optical scanning device is continuously used for 10 minutes as Comparative Example 1 in the case where each second scanning lens is located above the shaft bearing of each polygon mirror in the vertical direction. In this case, the temperature of each second scanning lens is increased due to the influence of the heat generated from each polygon mirror, so that the sub-scanning spot position difference occurs on the photosensitive drum. Therefore, the quality of the output image deteriorates.

Figure 23:
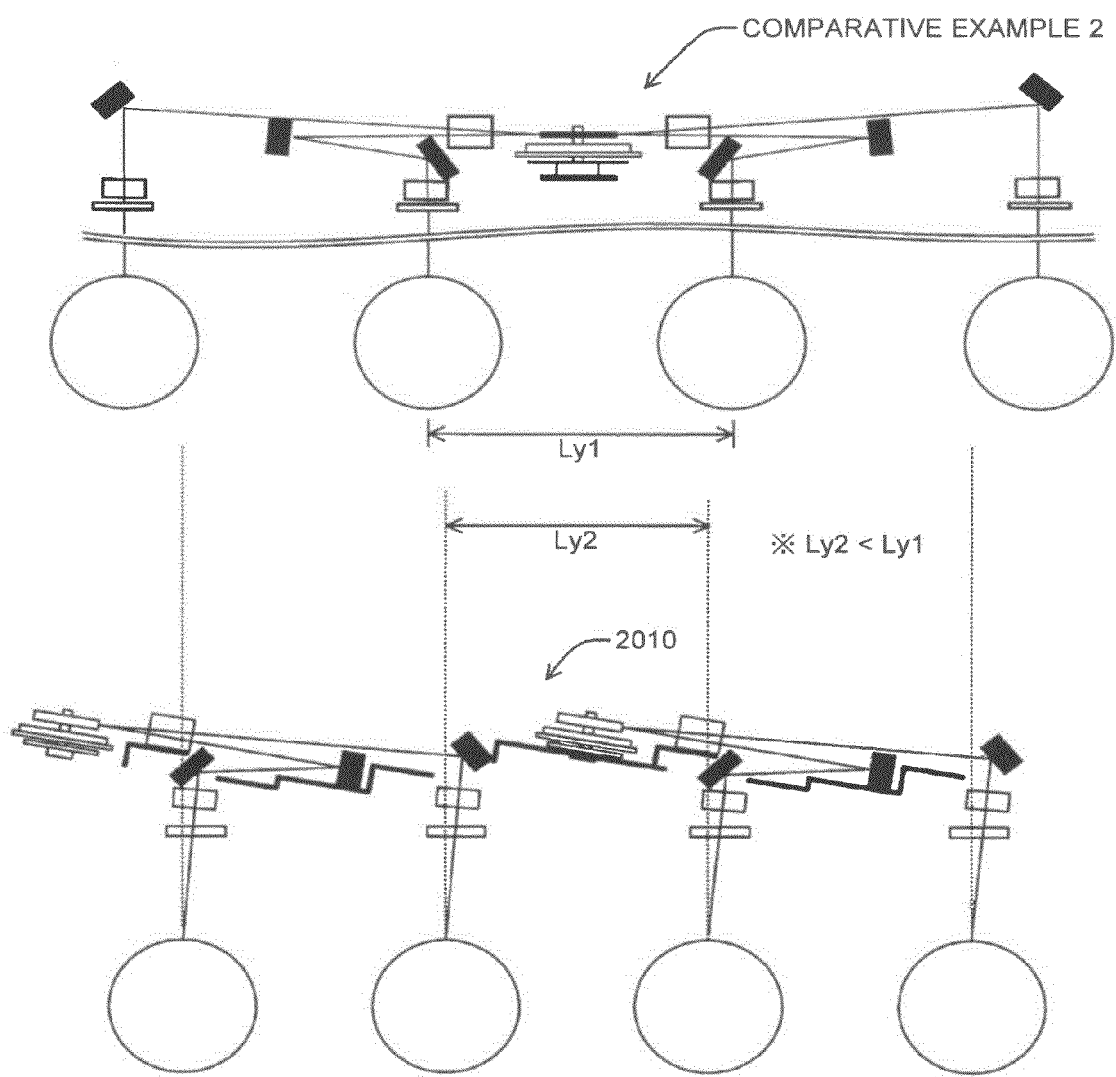
FIG. 23 is a diagram illustrating an optical scanning device according to Comparative Example 2.

In addition, FIG. 23 illustrates a layout diagram as Comparative Example 2 in the case of an opposite oblique incidence type. The optical parts are configured to be the same as those of the embodiment, and only the layout characteristics are compared with those of the optical scanning device 2010. In Comparative Example 2, the folding mirror and the second scanning lens are configured to be concentrated in the vicinity of the polygon mirror, so that the interval of the photosensitive drums cannot be configured to be smaller than the interval Ly1.

Figure 24:
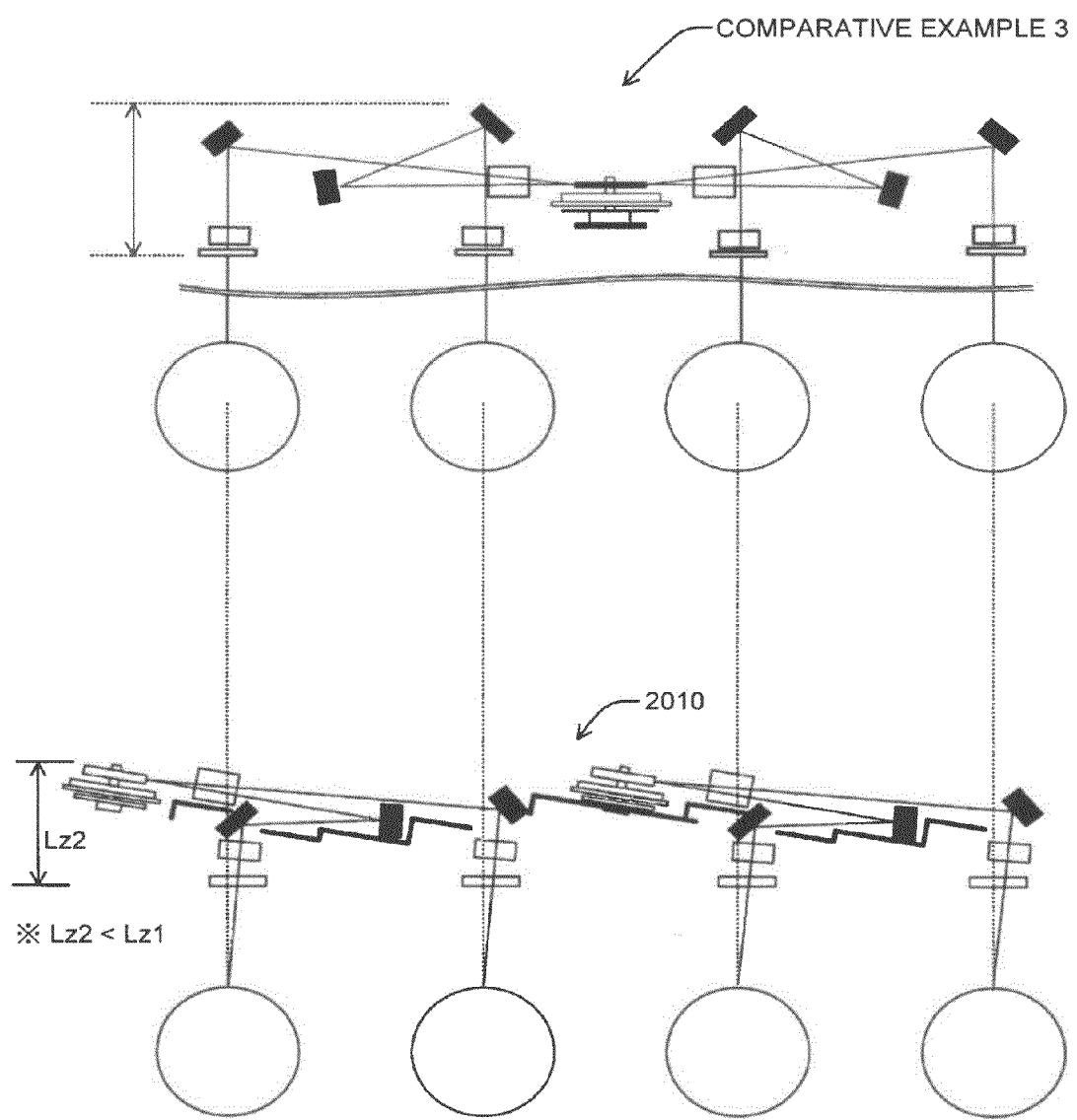
FIG. 24 is a diagram illustrating an optical scanning device according to Comparative Example 3.

In addition, FIG. 24 illustrates a layout diagram as Comparative Example 3 in the case where the folding mirror of the inner side station is disposed above the polygon mirror in the vertical direction. In this case, in comparison with the optical scanning device 2010 according to the embodiment, the temperature of the folding mirror is greatly increased, and the height of the main body of the device is increased.

In addition, in the embodiment, although the case where the toner image is transferred from the photosensitive drum through the transfer belt to the recording sheet is described, the invention is not limited thereto. The toner image may be directly transferred to the recording sheet.

In addition, in the embodiment, although the case where each light source has two light-emitting elements is described, the invention is not limited thereto.

In addition, in the embodiment, although the case where the color printer 2000 is used as the image forming apparatus is described, the invention is not limited thereto. For example, an optical plotter or a digital copying apparatus may be used as the image forming apparatus.

In addition, the invention may be applied to an image forming apparatus using a silver halide film as the image carrier. In this case, a latent image is formed on the silver halide film through optical scanning, and the latent image may be visualized through a process equivalent to a developing process in a general silver halide photographic process. In addition, the developed image can be transferred to printing paper as a transfer object material through a process equivalent to a printing process in the general silver halide photographic process. The image forming apparatus may be embodied as an optical platemaking apparatus or an optical image rendering apparatus which renders a CT scanned image or the like.

In addition, the invention may be applied to an image forming apparatus using a chromogenic medium (positive printing paper) which is colored by heat energy of a beam spot, as an image carrier. In this case, a visible image may be directly formed on the image carrier through optical scanning.

In short, any image forming apparatus which houses the optical scanning device 2010 may be implemented as a small-sized apparatus and may stably form a high quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans at least four scanned surfaces with light beams in a main-scanning direction, comprising:
   at least one housing to be positioned outside of the at least four scanned surfaces;
   first and second light deflectors, each including a plurality of reflecting surfaces rotating around an axis and receiving two light beams on a same reflecting surface in an oblique incidence manner with respect to a sub-scanning direction;
   first and second scanning optical systems of four scanning optical systems, each guiding at least one light beam deflected by the first light deflector to corresponding scanned surfaces of the at least four scanned surfaces; and
   third and fourth scanning optical systems of the four scanning optical systems, each guiding at least one light beam deflected by the second light deflector to corresponding scanned surfaces of the at least four scanned surfaces, wherein each of the four scanning optical systems has an optical plane having a strongest sub-scanning direction power, wherein each of the optical planes having the strongest sub-scanning direction power in the four scanning optical systems is located spaced apart from shaft bearings of the first light deflector and the second light deflector, wherein each of the optical planes having the strongest sub-scanning direction power is an optical plane of a scanning lens in a respective scanning optical system, wherein at least one of a first group including the first light deflector and the first and second scanning optical systems and a second group including the second light deflector and the third and fourth scanning optical systems is positioned within the at least one housing, wherein the optical planes having the strongest sub-scanning direction power in the first and second scanning optical systems are located between the first light deflector and the second light deflector in a first direction, wherein the optical planes having the strongest sub-scanning direction power in the four scanning optical systems are located spaced apart from the shaft bearings of the first light deflector and the second light deflector in a second direction that is perpendicular to the first direction, wherein a rotation shaft of at least one of the first and second light deflectors is disposed at an oblique angle with respect to the second direction, wherein at least part of a first folding mirror comprised in at least one of the scanning optical systems corresponding to the rotation shaft is disposed spaced apart from the rotation shaft in the first direction and on a first side of the shaft bearing corresponding to the rotation shaft in the second direction, and wherein at least part of a second folding mirror comprised in at least one of the scanning optical systems corresponding to the rotation shaft is disposed spaced apart from the rotation shaft in the first direction and on a second side opposite the first side of the shaft bearing corresponding to the rotation shaft in the second direction.

2. The optical scanning device according to claim 1, wherein each of the four scanning optical systems includes at least one additional scanning lens.

3. The optical scanning device according to claim 1, wherein each of the four scanning optical systems includes at least one additional scanning lens, and
wherein in each of the four scanning optical systems only the scanning lens has a sub-scanning direction power.

4. The optical scanning device according to claim 1, wherein the other of the first group and the second group is retained in a housing different from the at least one housing.

5. The optical scanning device according to claim 1, wherein the oblique angle is larger than an angle of oblique incidence of at least one light beam in each set of the two light beams received respectively on the same reflecting surface of each of the first and second light deflectors in an oblique incidence manner with respect to the sub-scanning direction, and
wherein all the optical planes having the strongest sub-scanning direction power are located at further positions from the shaft bearings in the second direction than a case in which the rotation shafts are assumed not to be oblique.

6. The optical scanning device according to claim 1, wherein each of the first and second light deflectors includes a heat releasing member that releases generated heat, and
wherein each heat releasing member is spatially separated from each scanning lens in the four scanning optical systems.

7. The optical scanning device according to claim 1, wherein the optical planes having the strongest sub-scanning direction power in the third scanning optical system and the fourth scanning optical system are disposed on a side of the second light deflector in the first direction opposite to the optical planes having the strongest sub-scanning direction power in the first scanning optical system and the second scanning optical system.

8. The optical scanning device according to claim 1, wherein the first direction is a horizontal direction and the second direction is a vertical direction,
wherein each of the optical planes having the strongest sub-scanning direction power in the four scanning optical systems are located below the shaft bearings of the first light deflector and the second light deflector in the vertical direction.

9. The optical scanning device according to claim 1, wherein a curvature in a sub-scanning corresponding direction is formed on only the emitting optical plane of each scanning lens.

10. The optical scanning device according to claim 1, wherein each scanning lens is provided in a respective metal plate member having a higher thermal conductivity than a respective scanning lens to release heat of the respective scanning lens.

11. The optical scanning device according to claim 10, wherein each metal plate member includes an adjusting screw that adjusts a deflection amount of the respective scanning lens.

12. The optical scanning device according to claim 10, wherein at least one metal plate member of the at least one of the first group and the second group is positioned in the at least one housing and
wherein an end portion of at least one side of the at least one metal plate member is exposed outside of the at least one housing.

13. An image forming apparatus comprising:
at least four image carriers; and
an optical scanning device that scans four scanned surfaces of at least the four image carriers with light beams that are modulated according to image data,
the optical scanning device including:
at least one housing positioned outside of the four image carriers,
first and second light deflectors, each including a plurality of reflecting surfaces rotating around an axis and receiving two light beams on a same reflecting surface in an oblique incidence manner with respect to a sub-scanning direction,
first and second scanning optical systems of four scanning optical systems, each guiding two light beams deflected by the first light deflector to corresponding scanned surfaces of the at least four scanned surfaces, and
third and fourth scanning optical systems of the four scanning optical systems, each guiding two light beams deflected by the second light deflector to corresponding scanned surfaces of the at least four scanned surfaces,
wherein each of the four scanning optical systems has an optical plane having a strongest sub-scanning direction power,
wherein each of the optical planes having the strongest sub-scanning direction power in the four scanning optical systems is located spaced apart from shaft bearings of the first light deflector and the second light deflector, wherein each of the optical planes having the strongest sub-scanning direction power is an optical plane of a scanning lens in a respective scanning optical plane, and wherein each scanning lens is provided in a respective metal plate member having a higher thermal conductivity than a respective scanning lens to release heat of the respective scanning lens, wherein the optical planes having the strongest sub-scanning direction power in the first and second scanning optical systems are located between the first light deflector and the second light deflector in a first direction, wherein the optical planes having the strongest sub-scanning direction power in the four scanning optical systems are located spaced apart from the shaft bearings of the first light deflector and the second light deflector in a second direction that is perpendicular to the first direction, wherein a rotation shaft of at least one of the first and second light deflectors is disposed at an oblique angle with respect to the second direction, wherein at least part of a first folding mirror comprised in at least one of the scanning optical systems corresponding to the rotation shaft is disposed spaced apart from the rotation shaft in the first direction and on a first side of the shaft bearing corresponding to the rotation shaft in the second direction, and wherein at least part of a second folding mirror comprised in at least one of the scanning optical systems corresponding to the rotation shaft is disposed spaced apart from the rotation shaft in the first direction and on a second side opposite the first side of the shaft bearing corresponding to the rotation shaft in the second direction.

14. The image forming apparatus according to claim 13, wherein the optical planes having the strongest sub-scanning direction power in the third scanning optical system and the fourth scanning optical system are disposed on a side of the second light deflector in the first direction opposite to the optical planes having the strongest sub-scanning direction power in the first scanning optical system and the second scanning optical system.

15. The image forming apparatus according to claim 13, wherein the first direction is a horizontal direction and the second direction is a vertical direction, wherein each of the optical planes having the strongest sub-scanning direction power in the four scanning optical systems are located below the shaft bearings of the first light deflector and the second light deflector in the vertical direction.

16. The image forming apparatus according to claim 13, wherein a curvature in a sub-scanning corresponding direction is formed on only the emitting optical plane of each scanning lens.

17. The image forming apparatus according to claim 13, wherein each scanning lens is provided in a respective metal plate member having a higher thermal conductivity than a respective scanning lens to release heat of the respective scanning lens.

18. The image forming apparatus according to claim 17, wherein each metal plate member includes an adjusting screw that adjusts a deflection amount of the respective scanning lens.

19. The image forming apparatus according to claim 17, wherein at least one metal plate member of the at least one of the first group and the second group is positioned in the at least one housing and wherein an end portion of at least one side of the at least one metal plate member is exposed outside of the at least one housing.

* * * * *